US011846809B2

(12) United States Patent
Alkeskjold et al.

(10) Patent No.: US 11,846,809 B2
(45) Date of Patent: Dec. 19, 2023

(54) PHOTONIC CRYSTAL FIBER ASSEMBLY

(71) Applicant: NKT Photonics A/S, Birkerød (DK)

(72) Inventors: Thomas Tanggaard Alkeskjold, Jyllinge (DK); Jens Kristian Lyngsøe, Hornbæk (DK); Christian Jakobsen, Virum (DK); Martin Dybendal Maack, Kongens Lyngby (DK); Mattia Michieletto, Copenhagen (DK); Sidsel Rübner Papior, Lyngby (DK)

(73) Assignee: NKT PHOTONICS A/S, Birkerød (DK)

( * ) Notice: Subject to any disclaimer, the term of this patent is extended or adjusted under 35 U.S.C. 154(b) by 0 days.

(21) Appl. No.: 17/744,401

(22) Filed: May 13, 2022

(65) Prior Publication Data

US 2022/0269012 A1 Aug. 25, 2022

Related U.S. Application Data

(63) Continuation of application No. 17/316,645, filed on May 10, 2021, now Pat. No. 11,360,274, which is a (Continued)

(30) Foreign Application Priority Data

Dec. 23, 2015 (DK) .......................... PA 2015 70876

(51) Int. Cl.
*G02B 6/38* (2006.01)
*G02B 6/02* (2006.01)
*G02B 6/42* (2006.01)

(52) U.S. Cl.
CPC ....... *G02B 6/3833* (2013.01); *G02B 6/02328* (2013.01); *G02B 6/3813* (2013.01); (Continued)

(58) Field of Classification Search
CPC .................................................. G02B 6/02328
See application file for complete search history.

(56) References Cited

U.S. PATENT DOCUMENTS

| 3,990,874 A | 11/1976 | Schulman |
| 4,551,162 A | 11/1985 | Hicks |
| (Continued) | | |

FOREIGN PATENT DOCUMENTS

| CN | 1269020 A | 10/2000 |
| CN | 1649801 A | 8/2005 |
| (Continued) | | |

OTHER PUBLICATIONS

112018038381, "Written Opinion", 8 pages.
(Continued)

*Primary Examiner* — Michael Stahl
(74) *Attorney, Agent, or Firm* — Hamilton, Brook, Smith & Reynolds, P.C.

(57) ABSTRACT

A photonic crystal fiber (PCF) assembly including a PCF and at least one ferrule structure. The PCF includes a core region and a cladding region and a first fiber end section with a first fiber end. The ferrule structure is mounted to the first fiber end section. The ferrule structure includes an inner ferrule arrangement and an outer ferrule arrangement surrounding the first fiber end section. The inner ferrule arrangement includes an inner ferrule front section proximally to the first fiber end and an inner ferrule rear section distally to the first fiber end, and each of the sections has an inner diameter and in at least a length thereof fully surrounds the PCF. The inner ferrule rear section is anchored in an anchor length section to the first fiber end section and the inner ferrule front section supports the first fiber end section proximally to the first fiber end.

32 Claims, 19 Drawing Sheets

Related U.S. Application Data continuation of application No. 16/775,555, filed on Jan. 29, 2020, now Pat. No. 11,002,919, which is a continuation of application No. 16/064,872, filed as application No. PCT/DK2016/050459 on Dec. 22, 2016, now Pat. No. 10,551,574.

(52) U.S. Cl.
CPC ........ *G02B 6/02314* (2013.01); *G02B 6/3874* (2013.01); *G02B 6/4296* (2013.01)

(56) References Cited

U.S. PATENT DOCUMENTS

| | | | |
|---|---|---|---|
| 4,575,181 A | 3/1986 | Ishikawa | |
| 4,737,011 A | 4/1988 | Iri et al. | |
| 5,018,821 A | 5/1991 | Kurata | |
| 5,210,816 A | 5/1993 | Iino et al. | |
| 5,291,570 A | 3/1994 | Filgas et al. | |
| 5,960,139 A | 9/1999 | Henning | |
| 6,334,019 B1 | 12/2001 | Birks et al. | |
| 6,347,178 B1 | 2/2002 | Edwards et al. | |
| 6,795,635 B1 | 9/2004 | Fajardo et al. | |
| 6,888,992 B2 | 5/2005 | Russell et al. | |
| 6,892,018 B2 | 5/2005 | Libori et al. | |
| 6,954,574 B1 | 10/2005 | Russell et al. | |
| 6,985,661 B1 | 1/2006 | Russell et al. | |
| 7,242,835 B2 | 7/2007 | Busse et al. | |
| 7,306,376 B2 | 12/2007 | Scerbak et al. | |
| 7,321,712 B2 | 1/2008 | Williams et al. | |
| 7,373,062 B2 | 5/2008 | Huber | |
| 7,792,408 B2 | 9/2010 | Varming | |
| 7,793,521 B2 | 9/2010 | Gallagher et al. | |
| 8,215,129 B2 | 7/2012 | Russell et al. | |
| 8,306,379 B2 | 11/2012 | Benabid et al. | |
| 8,393,804 B2 | 3/2013 | Nielson et al. | |
| 8,854,728 B1 | 10/2014 | Brooks et al. | |
| 8,938,146 B2 | 1/2015 | Lyngse et al. | |
| 10,139,560 B2 | 11/2018 | Poletti et al. | |
| 10,551,574 B2 | 2/2020 | Alkeskjold et al. | |
| 11,002,919 B2 | 5/2021 | Alkeskjold et al. | |
| 11,072,554 B2 | 7/2021 | Simonsen et al. | |
| 11,360,274 B2 | 6/2022 | Alkeskjold et al. | |
| 2002/0118938 A1 | 8/2002 | Hasegawa et al. | |
| 2002/0159734 A1 | 10/2002 | Sasaoka et al. | |
| 2003/0068150 A1 | 4/2003 | Ariel et al. | |
| 2003/0230118 A1 | 12/2003 | Dawes et al. | |
| 2005/0185908 A1 | 8/2005 | Roberts et al. | |
| 2005/0232560 A1 | 10/2005 | Knight et al. | |
| 2005/0233301 A1 | 10/2005 | Berd et al. | |
| 2005/0238301 A1 | 10/2005 | Russell et al. | |
| 2005/0286847 A1 | 12/2005 | Arimondi et al. | |
| 2006/0130528 A1 | 6/2006 | Nelson et al. | |
| 2006/0193583 A1 | 8/2006 | Dong et al. | |
| 2007/0009216 A1 | 1/2007 | Russell et al. | |
| 2007/0204656 A1 | 9/2007 | Gallagher et al. | |
| 2007/0237453 A1 | 10/2007 | Nielsen et al. | |
| 2007/0292087 A1 | 12/2007 | Brown | |
| 2008/0310806 A1 | 12/2008 | Mukasa | |
| 2009/0252459 A1 | 10/2009 | Nielson et al. | |
| 2009/0320526 A1 | 12/2009 | Carberry et al. | |
| 2010/0124393 A1 | 5/2010 | Li et al. | |
| 2010/0132406 A1 | 6/2010 | Huenermann | |
| 2010/0135616 A1 | 6/2010 | Watte et al. | |
| 2010/0303429 A1 | 12/2010 | Gibson et al. | |
| 2010/0326139 A1 | 12/2010 | Sugizaki et al. | |
| 2011/0013652 A1 | 1/2011 | Knight et al. | |
| 2011/0194816 A1 | 8/2011 | Kumkar et al. | |
| 2011/0195515 A1 | 8/2011 | Beat et al. | |
| 2012/0141079 A1 | 6/2012 | Gibson et al. | |
| 2013/0208737 A1 | 8/2013 | Clowes et al. | |
| 2014/0029896 A1 | 1/2014 | Zheng et al. | |
| 2014/0211818 A1 | 7/2014 | Hou et al. | |
| 2015/0192732 A1 | 7/2015 | Moselund | |
| 2017/0097464 A1 | 4/2017 | Challener et al. | |
| 2017/0160467 A1 | 6/2017 | Poletti et al. |
| 2018/0267235 A1 | 9/2018 | Russell et al. |
| 2018/0339931 A1 | 11/2018 | Simonsen et al. |
| 2018/0372961 A1 | 12/2018 | Alkeskjold et al. |
| 2019/0011634 A1 | 1/2019 | Lyngsøe et al. |
| 2019/0101695 A1 | 4/2019 | Poletti et al. |
| 2019/0135879 A1 | 5/2019 | Jakobsen et al. |
| 2020/0103587 A1 | 4/2020 | Lyngsøe et al. |
| 2020/0166699 A1 | 5/2020 | Bauerschmidt et al. |
| 2020/0310039 A1 | 10/2020 | Alkeskjold et al. |
| 2021/0323856 A1 | 10/2021 | Simonsen et al. |
| 2021/0341682 A1 | 11/2021 | Alkeskjold et al. |
| 2022/0011501 A1 | 1/2022 | Lyngsøe et al. |
| 2023/0018465 A1 | 1/2023 | Lyngsøe et al. |

FOREIGN PATENT DOCUMENTS

| | | |
|---|---|---|
| CN | 101122651 A | 2/2008 |
| CN | 101210977 A | 7/2008 |
| CN | 101426743 A | 5/2009 |
| CN | 101779149 A | 7/2010 |
| CN | 102066996 A | 5/2011 |
| CN | 201845110 U | 5/2011 |
| CN | 102815864 A | 12/2012 |
| CN | 103823277 A | 5/2014 |
| CN | 104078124 A | 10/2014 |
| CN | 104297839 A | 1/2015 |
| CN | 104568841 A | 4/2015 |
| EP | 1096285 A2 | 5/2001 |
| EP | 1495260 B1 | 9/2008 |
| EP | 2322489 A1 | 5/2011 |
| EP | 2479594 A1 | 7/2012 |
| EP | 2533081 A1 | 12/2012 |
| EP | 3374322 A1 | 9/2018 |
| GB | 2097149 A | 10/1982 |
| GB | 2255199 A | 10/1992 |
| GB | 2387666 A | 10/2003 |
| GB | 2518420 A | 3/2015 |
| JP | S62178203 A | 8/1987 |
| JP | S6486104 A | 3/1989 |
| JP | H0186104 U | 6/1989 |
| JP | H052118 A | 1/1993 |
| JP | H0792355 A | 4/1995 |
| JP | 2000180660 A | 6/2000 |
| JP | 2001-086104 A | 3/2001 |
| JP | 2001166176 A | 6/2001 |
| JP | 2001318244 A | 11/2001 |
| JP | 2002-506533 A | 2/2002 |
| JP | 2002-323625 A | 11/2002 |
| JP | 2003107281 A | 4/2003 |
| JP | 2003107294 A | 4/2003 |
| JP | 2003279758 A | 10/2003 |
| JP | 2004077979 A | 3/2004 |
| JP | 2004191947 A | 7/2004 |
| JP | 2004339004 A | 12/2004 |
| JP | 2005043638 A | 2/2005 |
| JP | 2006039147 A | 2/2006 |
| JP | 2006276882 A | 10/2006 |
| JP | 2008020741 A | 1/2008 |
| JP | 2009116193 A | 5/2009 |
| JP | 2009528248 A | 8/2009 |
| JP | 2010215458 A | 9/2010 |
| JP | 2011526704 A | 10/2011 |
| JP | 2011232706 A | 11/2011 |
| JP | 2018-045110 A | 3/2018 |
| JP | 2019-504350 A | 2/2019 |
| WO | 99 00685 A1 | 1/1999 |
| WO | 9935524 A2 | 7/1999 |
| WO | 0146734 A1 | 6/2001 |
| WO | 03078338 A2 | 9/2003 |
| WO | 03/87666 A1 | 10/2003 |
| WO | 03080524 A1 | 10/2003 |
| WO | 2004/083918 A1 | 9/2004 |
| WO | 2004083919 A1 | 9/2004 |
| WO | 2005012197 A2 | 2/2005 |
| WO | 2005091029 A2 | 9/2005 |
| WO | 2006072025 A2 | 7/2006 |
| WO | 2007106305 A2 | 9/2007 |
| WO | 2009010317 A1 | 1/2009 |

(56) References Cited

FOREIGN PATENT DOCUMENTS

| WO | 2009157977 A1 | 12/2009 |
|---|---|---|
| WO | 2010084964 A1 | 7/2010 |
| WO | 2012168400 A1 | 12/2012 |
| WO | 2013168400 A2 | 11/2013 |
| WO | 2015003714 A1 | 1/2015 |
| WO | 2015003715 A1 | 1/2015 |
| WO | 2015144181 A1 | 10/2015 |
| WO | 2015185761 A1 | 12/2015 |
| WO | 2017080564 A1 | 5/2017 |
| WO | 2017/108060 A1 | 6/2017 |
| WO | 2017108061 A1 | 6/2017 |

OTHER PUBLICATIONS

Günendi, M. C., et al., "Broad-band robustly single-mode hollow-core PCF by resonant filtering of higher order modes", 7 Pages.
Kolyadin, A., et al., "Light transmission in negative curvature hollow core fiber in extremely high material loss region", Opt. Express vol. 21, No. 8, 9514-9519, 6 pages.
SG 11201804738S, "Written Opinion", 8 pages.
Office Action (Examination Report) dtaed Jul. 16, 2020, by the Intellectual Property Office of Singapore in Corresponding Singapore Application No. 11201804707Y, 3 pages.
Belardi et al., "Hollow Antiresonant Fibers with Low Bending Loss", Optics Express, vol. 22, No. 8, 2014, 6 pages.
Notice of Allowance dated Jun. 14, 2022, issued in the corresponding Japanese Patent Application No. 2018-532357, with English Translation, 8 pages.
Notification of Reasons for Rejection dated Apr. 19, 2022, issued in the corresponding Japanese Patent Application No. 2018-532462, with English Translation, 11 pages.
U.S. Appl. No. 17/942,709, Jens Kristian Lyngsøe, filed Sep. 12, 2022.
Office Action dated Jan. 11, 2023, by the Canadian Intellectual Property Office in Canadian Patent Application 3,008,919, (5 pages).
Office Action (Notification of Reasons for Rejection) dated Apr. 4, 2023, by the Japanese Patent Office in corresponding Japanese Patent Application No. 2022-030754, and an English Translation of the Office Action. (12 pages).
Office Action (First Office Action) dated Jan. 5, 2023, by the State Intellectual Property Office in corresponding Chinese Patent Application No. 202110941422.9, and an English Translation of the Office Action. (23 pages).
Office Action (First office Action) dated Jan. 5, 2023, by the State Intellectual Property Office in corresponding Chinese Patent Application No. 202110941824.9 and an English Translation of the Office Action. (22 pages).
International Search Report (PCT/ISA/210) dated Jun. 30, 2017, by the Danish Patent Office as the International Searching Authority for International Application No. PCT/DK2017/050127.
Written Opinion (PCT/ISA/237) dated Jun. 30, 2017, by the Danish Patent Office as the International Searching Authority for International Application No. PCT/DK2017/050127.
112018038381, "Written Opinion", 8 pages. (dated 2019).
Search Report and Search Opinion dated Jun. 2, 2016, by Danish Patent and Trademark Office in corresponding Application No. PA 2015 70876, 6 pages.
Search Report dated Jun. 30, 2016 by the Danish Patent and Trademark Office in corresponding Application No. PA 2015 70877, 4 pages.
Belardi W, et al., "Design and properties of hollow antiresonant fibers for the visible and near infrared spectral range", doi: 10.1364/OE.23.017394, Jan. 2015.
CN 201680075508.5 , "Office Action (First Office Action)", English Translation of the Office Action, dated Oct. 8, 2019, 20 pages.
First Official Action dated Oct. 12, 2019, by the State Intellectual Property Office of the People's Republic of China in corresponding Chinese Patent Application No. 201680075502.8, and English-language (machine generated) translation thereof (29 pages).

The extended European Search Report dated May 28, 2019, by the European Patent Office in European Patent Application No. 16863710.6-1105. (8 pages).
The extended European Search Report dated Jul. 9, 2019, by the European Patent Office in European Patent Application No. 16877822.3-1003. (12 pages).
Günendi, M. C., et al., "Broad-band robustly single-mode hollow-core PCF by resonant filtering of higher order modes", 7 Pages. (2015).
Habib, Md. S., et al., "Low-loss hollow-core silica fibers with adjacent nested anti-resonant tubes", vol. 23, No. 13, Optics Express, Jun. 24, 2015, 13 pages.
Kolyadin, A., et al., "Light transmission in negative curvature hollow core fiber in extremely high material loss region", Opt. Express vol. 21, No. 8, 9514-9519, 6 pages. (2013).
Kolyadin A. N., et al., "Negative curvature hollow-core fibers: dispersion properties and femtosecond pulse delivery", Elsevier—Physics Procedia, vol. 73, 2015, pp. 59-66.
Search Report dated Jun. 3, 2018, by the Danish Patent and Trademark Office in corresponding Application No. PA 2015 70724. (5 pages).
Written Opinion (PCT/ISA/237) dated Mar. 3, 2017, by the Denmark Patent Office as the International Searching Authority for International Application No. PCT /DK2016/050460.
International Search Report (PCT/ISA/210) dated Mar. 3, 2017, by the Denmark Patent Office as the International Searching Authority for International Application No. PCT/DK2016/050460.
Poletti, F., "Nested antiresonant nodeless hollow core fiber", vol. 22, No. 20, Opt. Express, Sep. 22, 2014, 22 pages.
Written Opinion dated Oct. 4, 2019, by the Intellectual Property Office of Singapore in corresponding Singapore Patent Application No. 11201804707Y, (8 pages).
SG 11201804738S, "Written Opinion", 8 pages. (dated 2019).
Sorensen T., et al., "Metal-assisted coupling to hollow-core photonic crystal fibres", Electronics Letters, vol. 41, No. 12, Jun. 9, 2005, 2 pages.
Vincetti L., et al., "Waveguiding mechanism in tube lattice fibers", vol. 18, No. 22, Optics Express, Oct. 25, 2010, 14 pages.
The extended European Search Report dated Jul. 23, 2019, issued by the European Patent Office in corresponding European Patent Application No. 16877821.5-1003. (11 pages).
Office Action (Second Office Action) dated Apr. 8, 2020 by the Chinese Patent Office in corresponding Chinese Patent Application No. 201680075502.8, and an English Translation of the Office Action. (9 pages).
Office Action {Second Office Action) dated Jun. 9, 2020 in the corresponding Chinese Application No. J01680075508.5, 12 pages.
Extended European Search Report dated Dec. 4, 2019 in the corresponding European patent application No. 17788848.4-1105, 8 pages.
Office Action dated Jun. 17, 2020 in the corresponding European Application No. 16877822.3, 7 pages.
Office Action (Examination Report) dated Jul. 16, 2020, by the Intellectual Property Office of Singapore in Corresponding Singapore Application No. 11201804707Y, 3 pages.
Office Action {Communication pursuant to Article 94(3) EPC) dated Aug. 12, 2020, by the European Patent Office in corresponding European Application No. 16 877 821.5-1001, 6 pages.
Office Action {Non-Final) issued by the U.S. Patent and Trademark Office in the U.S. Appl. No. 15/774,780 dated Aug. 28, 2020, U.S. Patent and Trademark Office, Alexandria, VA. (26 pages).
Examination Report dated Sep. 8, 2020 by the Intellectual Property Office of Singapore in corresponding Singapore Patent Application No. 11201804738S, (4 pages).
Office Action (First Office Action) dated Sep. 8, 2020 by the China National Intellectual Property Administration in corresponding Chinese Patent Application No. 201680078462.2 and an English Translation of the Office Action. (43 pages).
Office Action (Communication pursuant to Article 94(3) EPC) dated Oct. 10, 2020, by the European Patent Office in corresponding European Application No. 16 863 710.6-1105. (5 pages).

(56) References Cited

OTHER PUBLICATIONS

Office Action dated Nov. 19, 2020, by the Japanese Patent Office in corresponding Japanese Patent Application No. 2018-532357, and an English Translation of the Office Action. (15 pages).
Office Action dated Nov. 24, 2020, by the Japanese Patent Office in corresponding Japanese Patent Application No. 2018-532462, (6 pages).
Extended European Search Report dated May 6, 2022, by the European Patent Office in European Patent Application No. 22153290.6. (9 pages).
Office Action (Decision of Rejection) dated Nov. 2, 2021, by the Japanese Patent Office in corresponding Japanese Patent Application No. 2018-532462, and an English Translation of the Office Action. (11 pages).
Advisory Action received for U.S. Appl. No. 16/096,878, dated Jan. 28, 2022, 3 pages.
Belardi W, et al., "Design and properties of hollow antiresonant fibers for the visible and near infrared spectral range", Journal of Lightwave Technology, vol. 33, No. 21, Jan. 2015, pp. 4497-4503.
Belardi, W. et al., "Hollow antiresonant fibers with low bending loss" Optics Express, vol. 22, No. 8, 2014, pp. 10091-10096.
Final Office Action for U.S. Appl. No. 17/356,620 entitled Element for a Preform, a Fiber Production Method and an Optical Fiber Drawn From the Preform, dated Jun. 1, 2023.
Final Office Action received for U.S. Appl. No. 16/096,878, dated Nov. 1, 2022, 21 pages.
Final Office Action received for U.S. Appl. No. 16/096,878, dated Oct. 18, 2021, 16 pages.
First Office Action and Search Report dated Jul. 28, 2023 by CNIP application No. 2022109660637.
International Search Report and Written Opinion received for PCT Patent Application No. PCT/DK2016/050364, dated Feb. 10, 2017, 20 pages.
International Search Report and Written Opinion received for PCT Patent Application No. PCT/DK2016/050459, dated Feb. 28, 2017, 20 pages.
Invitation to Written Opinion dated Dec. 28, 2020, by the Intellectual Property Office of Singapore in corresponding Singapore Patent Application No. 11201803838T, (6 pages).
Monro, Microstructured Optical Fibers, Guided Wave Optical Components and Devices, Chapter 3, 41-70, 2006.
Non-Final Office Action received for U.S. Appl. No. 16/096,878, dated Feb. 4, 2021, 18 pages.
Non-Final Office Action received for U.S. Appl. No. 16/096,878, dated Jul. 19, 2022, 22 pages.
Non-Final Office Action received for U.S. Appl. No. 16/096,878, dated Mar. 21, 2023, 21 pages.
Notice of Allowance (Decision to Grant a Patent) dated Jan. 25, 2022, in Japanese Patent Application No. 2018-523498 and an English Translation of the Notice of Allowance. (8 pages).
Office Action (Communication pursuant to Article 94(3) EPC) dated Aug. 4, 2021 by the European Patent Office in corresponding European Application No. 16 877 822.3-1001. (6 pages).
Office Action (Communication pursuant to Article 94(3) EPC) dated Jun. 16, 2023, by the European Patent Office in corresponding European Application No. 17788848.4 6 pages.
Office Action (Communication pursuant to Article 94(3) EPC) dated Feb. 2, 2023, by the European Patent Office in corresponding European Application No. 16 863 710.6-1105, (4 pages).
Office Action (Decision of Rejection) dated Jul. 22, 2023, by the State Intellectual Property Office in corresponding Chinese Patent Application No. 202110941422.9, and an English Translation of the Office Action.
Office Action (Decision of Rejection) dated Jul. 22, 2023, by the State Intellectual Property Office in corresponding Chinese Patent Application No. 202110941824.9, and an English Translation of the Office Action.
Office Action (Decision of Rejection) dated Aug. 10, 2021, by the Japanese Patent Office in corresponding Japanese Patent Application No. 2018-523498, with English Translation (9 pages).
Office Action (Notice of Reasons for Refusal) dated Mar. 1, 2022, by the Japanese Patent Office in corresponding Japanese Patent Application No. 2018-532357, and an English Translation of the Office Action. (6 pages).
Office Action (Notice of Reasons for Refusal) dated Oct. 28, 2021, by the Japanese Patent Office in corresponding Japanese Patent Application No. 2018-532357, and an English Translation of the Office Action. (12 pages).
Office Action (Notice of Reasons for Rejection) dated Dec. 8, 2020, by the Japanese Patent Office in corresponding Japanese Patent Application No. 2018-523498, and an English Translation of the Office Action. (7 pages).
Office Action (Notice of Second Review Opinion) dated Oct. 8, 2021, by the State Intellectual Property Office in Corresponding Chinese Patent Application No. 201780039576.0, and an English Translation of the Office Action. (10 pages).
Office Action (Second Office Action) dated Jul. 26, 2021 by the China National Intellectual Property Administration in corresponding Chinese Patent Application No. 201680078462.2, and an English Translation of the Office Action. (15 pages).
Office Action (Second Office Action) dated Sep. 5, 2023, by the Japanese Patent Office in corresponding Japanese Patent Application No. 2022-030754.
Office Action (The First Office Action) dated Apr. 12, 2021, by the State Intellectual Property Office of the People's Republic of China in corresponding Chinese Patent Application No. 201780039576.0, and an English Translation of the Office Action. (20 pages).
Office Action (The Third Office Action) dated Dec. 14, 2021, by the State Intellectual Property Office of the People's Republic of China in corresponding Chinese Patent Application No. 201680078462.2, and an English Translation of the Office Action. (7 pages).
Office Action dated Dec. 1, 2020, by the Japanese Patent Office in corresponding Japanese Application No. 2018-532357, with English Translation. (15 pages).
Office Action dated Oct. 28, 2020, by the Sate Intellectual Property Office of the People's Republic of China (National Chizawa Bureau) in corresponding Chinese Patent Application No. 201680075508.5 and an English translation of the Office Action. (6 pages).
Office Action dated Dec. 19, 2022, by the Canadian Intellectual Property Office in Canadian Patent Application No. 3,008,053 (6 pages).
Office Action dated Nov. 4, 2022, by the Canadian Intellectual Property Office in Canadian Patent Application No. 3,004,945 (3 pages).
U.S. Appl. No. 17/213,653, Jens Kristian Lyngsøe, filed Mar. 26, 2021.

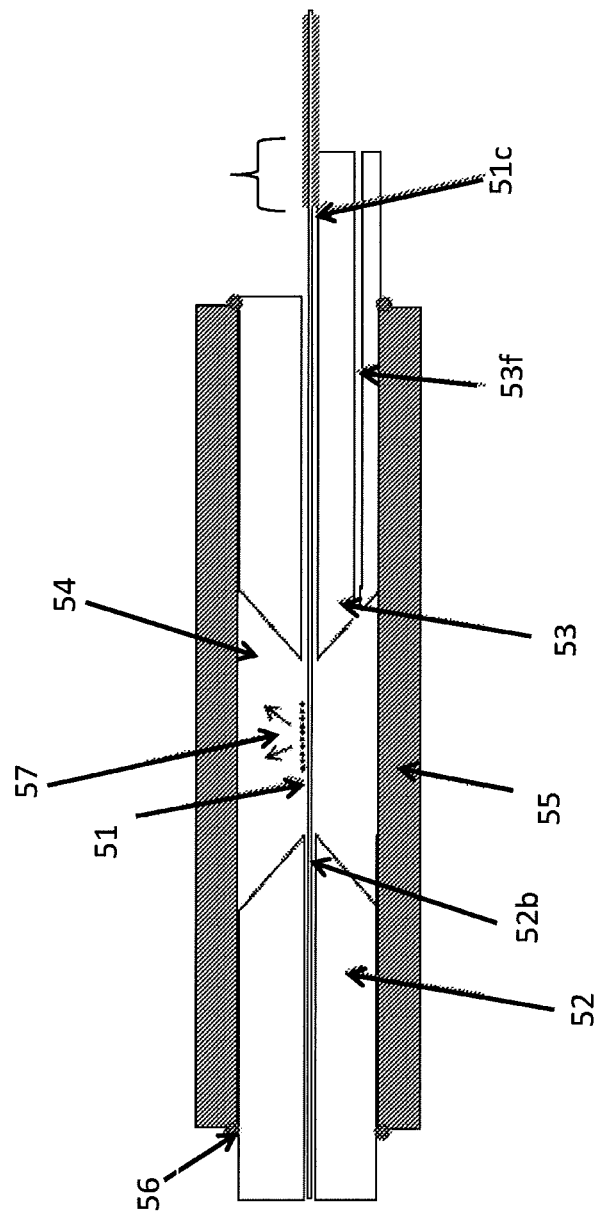

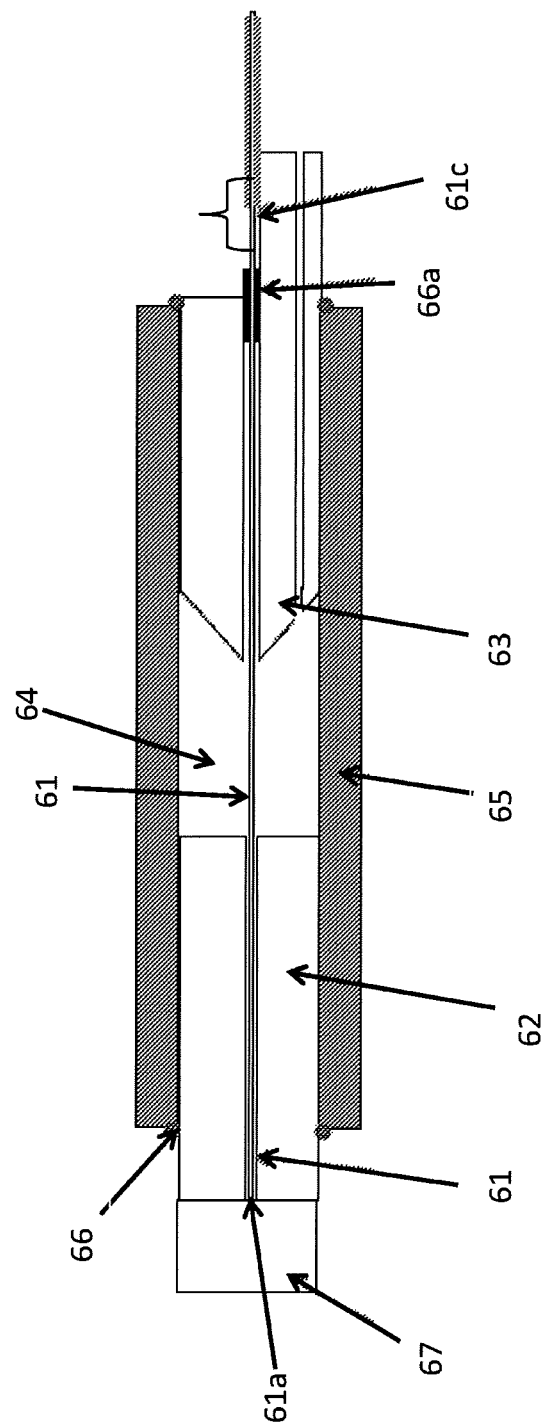

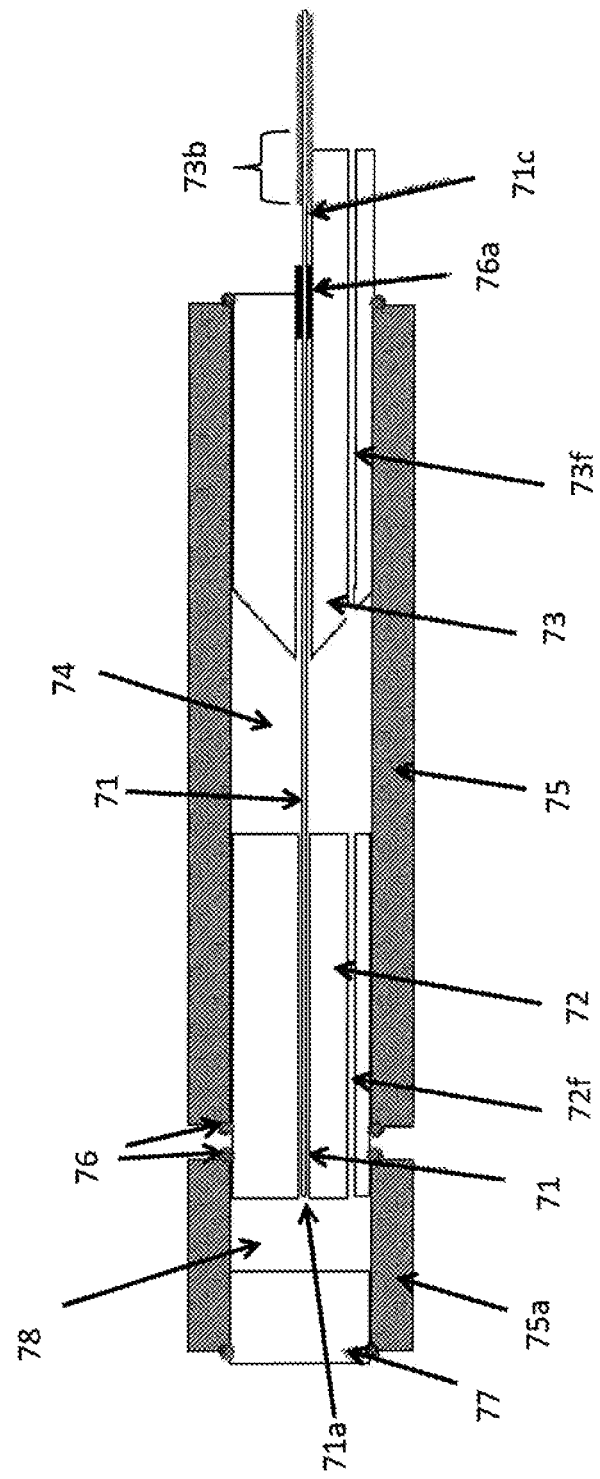

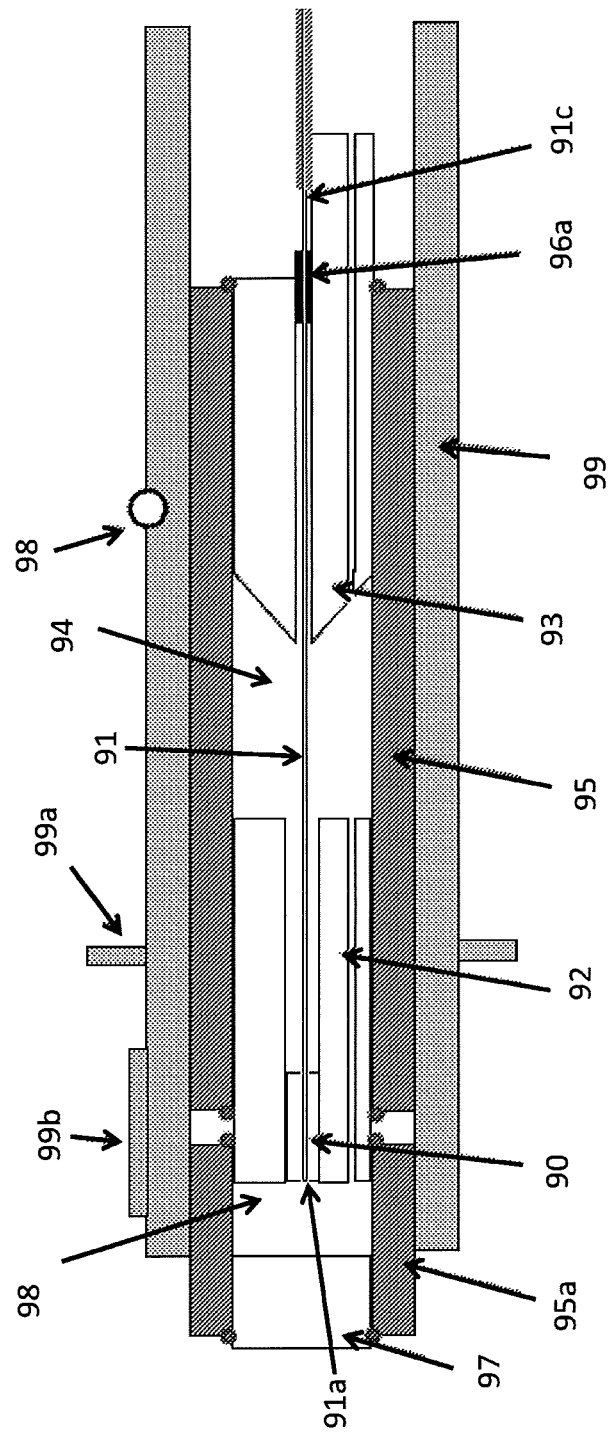

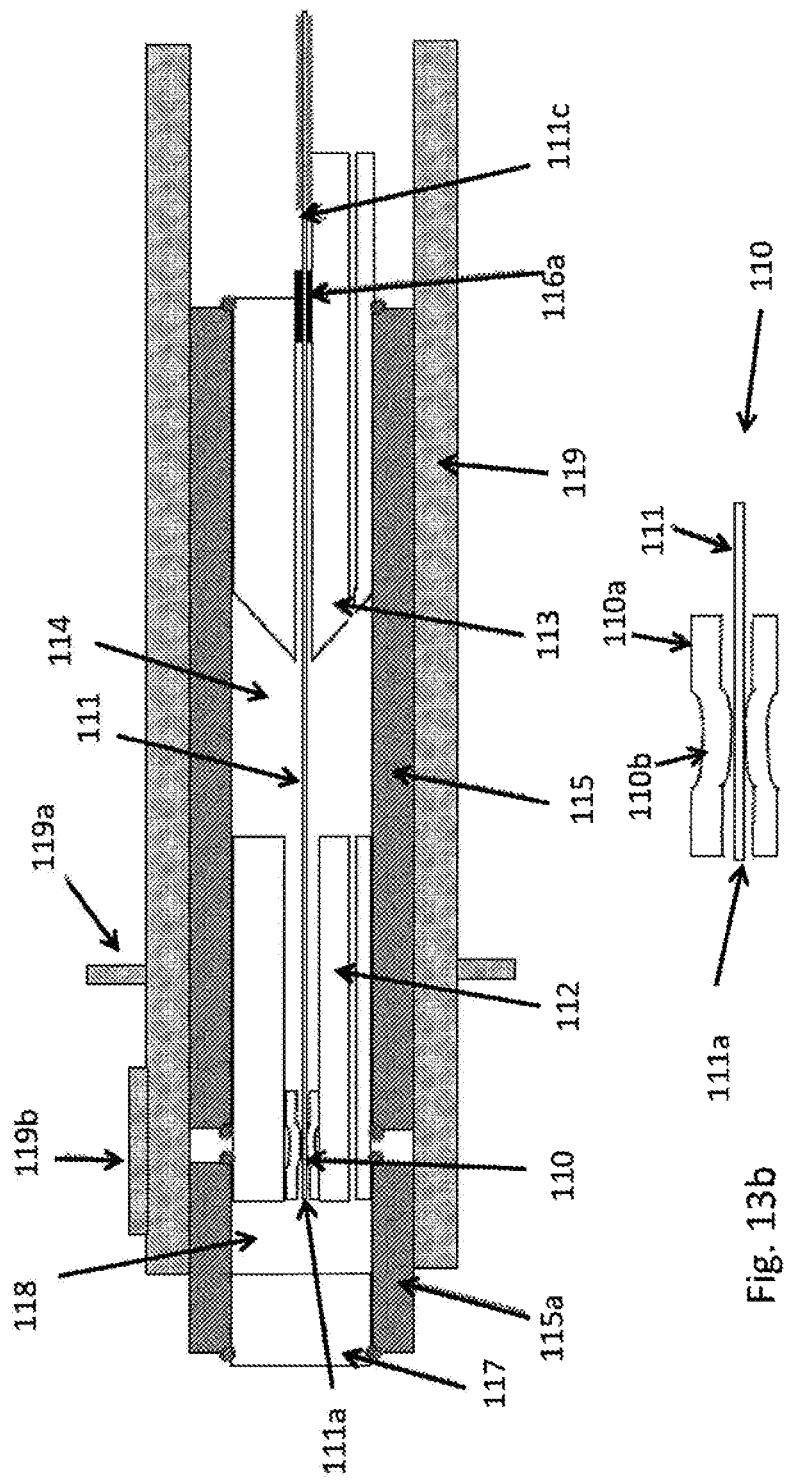

PHOTONIC CRYSTAL FIBER ASSEMBLY

CROSS REFERENCE TO RELATED APPLICATIONS

The present application is a continuation of U.S. application Ser. No. 17/316,645, filed on May 10, 2021, which is a continuation of U.S. application Ser. No. 16/775,555, filed on Jan. 29, 2020, now U.S. Pat. No. 11,002,919, which is a continuation of U.S. application Ser. No. 16/064,872, filed on Jun. 21, 2018, now U.S. Pat. No. 10,551,574, which is U.S. national stage of International Application No. PCT/DK2016/050459, filed on Dec. 22, 2016, which claims the benefit of Danish Application No. PA 2015-70876, filed on Dec. 23, 2015. The entire contents of each of U.S. application Ser. No. 17/316,645, U.S. application Ser. No. 16/775,555, U.S. application Ser. No. 16/064,872, International Application No. PCT/DK2016/050459, and Danish Application No. PA 2015-70876 are hereby incorporated herein by reference in their entirety.

TECHNICAL FIELD

The invention relates to a photonic crystal fiber (PCF) assembly comprising a PCF and at least one ferrule structure. The invention also comprises a laser system and an apparatus comprising such laser system. Further the invention comprises a set of correlated ferrule elements.

BACKGROUND ART

Photonic crystal fibers, herein referred to as PCF, belong to a class of fibers comprising optical nano or micro structures that affect the motion photons. PCF (sometimes called holey fiber, hole-assisted fiber, microstructure fiber, or microstructured fiber) at least partly obtains its waveguide properties by an arrangement of microstructures e.g. in the form of air (or gas) holes or solid microstructures with a refractive index differing from the surrounding background material. There is a great variety of hole/microstructure arrangements, leading to PCFs with very different properties.

Examples of PCFs include the PCFs described in U.S. Pat. No. 6,985,661, 8,938,146 or 7,792,408.

The termination of such PCFs is often rather difficult in particular due to the microstructures and optionally hollow microstructures and/or a hollow core.

Terminal structures for traditional step-index fibers, i.e. optical fibers with a core having a uniform refractive index and a surrounding cladding having a lower refractive index providing a sharp decrease in refractive index at the core-cladding interface, are well known. U.S. Pat. No. 4,737,011 discloses a connector for a large core step-index fiber designed such that high power light pumped into the end of the fiber has low risk in burning or melting the connector material. The connector comprises a holder with a metallic plug body and a radially inwardly arranged sleeve having a support portion adapted to support the optical fiber at a distance from the end-facet of the optical fiber and wherein the support portion employs a transparent or a translucent heat resistant inorganic substance e.g. ceramic material or sapphire having a melting point of 1500° C. or more and having a refractive index higher than that of the cladding of the optical fiber. It is not described how the fiber is mounted in the connector.

Generally it is desired to terminate an optical fiber such that it is simple to handle and is sufficiently protected against dust, moisture and heat.

The small diameter and core diameter of the PCF and its typically high flexibility require that a termination of the PCF is held in a mechanically rigid structure—normally called a ferrule or a ferrule structure—at termination points in order to be practically useful in precise beam delivery systems.

U.S. Pat. No. 7,242,835 discloses a fiber termination combination which includes an optical fiber having a fiber core for transmitting a highly energetic optical signal that can damage the fiber, and a structured region around the core for directing the optical signal into the core, the structured region being characterized by multiple channels of smaller internal diameter than the core defined by thin walls disposed around the core; a ferrule, with an opening therein for locating the fiber, at the end of the fiber enveloping the fiber extremity which cooperates with the blocking structure to block the optical signal from impinging on the microstructured region of the fiber; and a blocking structure disposed over the end of the fiber with an opening mating with the fiber core, the blocking structure blocking the optical signal from impinging on the microstructured region of the fiber.

U.S. Pat. No. 7,373,062 discloses an optical fiber which comprises a hollow fiber core, wherein the front faces of both fiber ends of the hollow fiber core are open and each fiber end is surrounded by a protection element in a dust-proof fashion. The protection element includes a window at its front face in front of the fiber end to couple and decouple light to and from the hollow fiber core.

U.S. Pat. No. 7,306,376 discloses a monolithic optical ferrule wherein a fiber is terminated bonded by fusion to form a monolithic unit which minimizes optical loss and is typically capable of transmitting high power laser radiation, preferably in the order of 500 W and higher, without damage to the fiber and ferrule. The end cap, fiber and fusible powder are composed of material of substantially the same physical characteristics such that, when all are fused together, the structure so formed is monolithic and the optical path is transparent.

The prior art fiber terminations disclosed above are generally difficult to mount to the fiber and often result in damaging of the fiber or result in a poor alignment in the z-direction (the axial direction of the fiber) and/or a poor anchoring of the optical fiber which result in a poor coupling of the fiber to another element.

DESCRIPTION OF THE INVENTION

The object of the invention is to provide an end termination structure of a PCF which alleviates at least one of the drawbacks described above.

In an embodiment it is an object to provide an end termination structure of a PCF which provides a good alignment of the PCF and the ferrule in the z-direction and which is relatively simple to assemble.

In an embodiment it is an object to provide an end termination structure of a PCF which provides a safe protection of the PCF, at its terminated end, in particular against dust, moisture and/or heat.

In an embodiment it is an object to provide an end termination structure of a PCF which provides new options for stripping off cladding modes.

In an embodiment it is an object to provide an end termination structure of a PCF which has a long lifetime even where the PCF is operating at relatively high power, such as power above 5 KW.

These and other objects have been solved by the invention or embodiments thereof as defined in the claims and as described herein below.

It has been found that the invention or embodiments thereof have a number of additional advantages which will be clear to the skilled person from the following description.

The term "z-direction" means the axial direction and the term "axially" means along the axis.

The phrase "radial distance" means distance determined in radial direction from the center axis of the structure in question, such as the PCF, the ferrule structure or an element thereof. The phrase "radial direction" is a direction from the center axis and radially outwards and "radially" in a radial orientation relative to the axis.

The term "substantially" should herein be taken to mean that ordinary product variances and tolerances are comprised within the scope of the term.

The term "about" is generally used to include what is within measurement uncertainties. The term "about" when used in ranges, should herein be taken to mean that what is within measurement uncertainties is included in the range.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

All diameters are cross sectional diameters unless otherwise specified.

According to the invention an end termination structure has been provided in the form of a PCF assembly.

The PCF assembly of the invention comprises a PCF and at least one ferrule structure. The PCF has a center axis and comprises a core region and a cladding region and a first fiber end section with a first fiber end.

The ferrule structure has a center axis and is mounted to the first fiber end section. The ferrule structure comprises an inner ferrule arrangement and an outer ferrule arrangement surrounding the first fiber end section. In accordance with the invention it has been found that by providing the ferrule structure with an inner ferrule arrangement and an outer ferrule arrangement a new type of the ferrule structure is provided which provides a much simpler assembling of the fiber and the ferrule structure. In particular it has been found that by shaping the inner ferrule arrangement such that is comprise an inner ferrule front section and an inner ferrule rear section, a much simpler assembling is provided.

In an embodiment the inner ferrule arrangement comprises the inner ferrule front section proximally to the first fiber end and the inner ferrule rear section distally to the first fiber end. Each of the inner ferrule sections has an inner cross sectional diameter and in at least a length thereof fully surrounds the PCF. The inner ferrule rear section is anchored in an anchor length section to the first fiber end section and the inner ferrule front section supports the first fiber end section proximally to the first fiber end. Advantageously the inner ferrule front section is not fixed or anchored to the first fiber end section, but merely supports the first fiber end section to ensure a correct radial alignment.

In an embodiment the phrase "proximally to the first fiber end" mean close to the first fiber end, preferably adjacent to the first fiber end The PCF center axis at the first fiber end section and the ferrule structure center axis are preferably substantially parallel. The PCF may in principle be arranged at a distance from the ferrule structure center axis, however for most applications it is desired that the PCF center axis at the first fiber end section and the ferrule structure center axis are coincident, thereby making the assembling simpler.

In the assembling the first fiber end section is mounted and anchored in the inner ferrule rear section. Subsequently, prior to or simultaneously the first fiber end section is mounted in the inner ferrule front section and the first fiber end is aligned to a desired position in the z-direction. Thereafter the outer ferrule arrangement is mounted to hold the inner ferrule front section and the inner ferrule rear section in position relative to each other and thereby to fix the first fiber end alignment relative to the ferrule structure. By providing the direct anchoring of the fiber exclusively to the inner ferrule rear section a much simpler alignment of the fiber end facet may be obtained since the distance between the inner ferrule front section and the inner ferrule rear section may be adapted to position the fiber end facet at a desired position in z-direction before fixing the distance between the inner ferrule front section and the inner ferrule rear section by mounting the inner ferrule front section and the inner ferrule rear section to the outer ferrule arrangement.

In an embodiment the inner ferrule front section and the inner ferrule rear section are not directly fixed to each other, but they are merely coupled and held in position by the outer ferrule arrangement. Preferably the inner ferrule front section and the inner ferrule rear section are arranged to have an intermediate gap in the axial direction. The gap advantageously provides a distance in the axial direction between the inner ferrule front section and the inner ferrule rear section. The distance is preferably in the range from about 1 mm to about 10 cm, such as from about 5 mm to about 2 cm.

In an embodiment the intermediate gap between the inner ferrule front section and the inner ferrule rear section extends partly around the PCF, for example to form a semi-annular gap. In an embodiment the gap extends fully around the PCF to form an annular gap and thereby a distance between the inner ferrule front section and the inner ferrule rear section. In both instances a part of the first fiber end section is not covered by the inner ferrule arrangement.

In an embodiment the assembly further comprises an alignment sleeve arranged between the inner ferrule front section and the first fiber end section. Thereby the inner ferrule front section supports the first fiber end section proximally to the first fiber end via the alignment sleeve. The alignment sleeve is preferably arranged to surround and support the first fiber end section at the first fiber end.

In the assembling the alignment sleeve is mounted to the first fiber end section in a desired position in z-direction relative to the first fiber end and thereafter the inner ferrule front section is mounted.

The alignment sleeve and the use thereof has been found to be very beneficial because PCFs generally differ much in outer diameter and therefore without an alignment sleeve would require individual sizes of inner ferrule front sections. Further—as explained below—the alignment sleeve may be provided to fit to PCFs with different outer diameters e.g. by crimping the alignment sleeve around the fiber to provide sufficient support.

Advantageously the alignment sleeve supports the first fiber end section, by being collapsed onto the first fiber end section in its whole length or in the support section thereof. Suitable material for the alignment sleeve therefore includes material which may be crimped or collapsed onto the first fiber end section e.g. by application of heat. The alignment sleeve is advantageously not fixed or anchored to the first fiber end section but is preferably held mechanically in position to provide a desired axial support to the fluorophores.

In an embodiment the alignment sleeve is fused to the PCF.

Advantageously the alignment sleeve is of glass, preferably silica glass, such as fused silica glass, fused quartz and/or doped silica, and/or borosilicate glass, such as a borosilicate glass comprising approximately 96% silica and 4% boron trioxide e.g. such as the glass sold under the tradename Vycor™.

The doped glass may for example include fluoride doped silica, boron doped silica and/or germanium doped silica. By doping the glass, the glass may become more malleable and simpler to collapse.

It has been found to be advantageous that the said alignment sleeve is of silica with refractive index of up to 1.45 for light at 1 µm, such as for light in the range 1-2 µm.

In an embodiment the alignment sleeve is of down doped silica, such as silica doped with fluorine and/or boron.

In an embodiment the alignment sleeve has a refractive index which is less than an effective refractive index of the cladding region.

Advantageously the alignment sleeve is substantially fully transparent for the wavelengths of light transmitted or transmittable in the PCF, thereby the risk of excessive heating due to absorbing light is reduced or even avoided.

The alignment sleeve is preferably a capillary tube which has been applied to surround the PCF and collapsed by heat in at least the support section thereof such as a mid-section thereof to thereby being arranged to support the PCF first fiber end section. This construction is very simple and effective and thereby economically feasible.

By only collapsing a section of the alignment sleeve, the non-collapsed length parts of the alignment sleeve may be shaped to have an outer cross sectional diameter which fits to the cross sectional inner diameter of the inner ferrule front section. Thereby, the inner diameter of the inner ferrule front section is correlated to the outer diameter of the non-collapsed alignment sleeve and PCFs with different outer diameters can be mounted in the alignment sleeve by collapsing of a support length section of the alignment sleeve.

Advantageously the alignment sleeve is hold within said inner ferrule front section without any intermediate material between the alignment sleeve and the inner ferrule front section. In an embodiment the alignment sleeve is mechanically hold and/or fused to said inner ferrule front section.

Advantageously the inner ferrule front section surrounds and holds the alignment sleeve in a preselected axial position. The inner diameter of the inner ferrule front section is advantageously correlated to the alignment sleeve by being slightly larger than a maximal outer diameter of the alignment sleeve, such as slightly larger to allow the alignment sleeve to be inserted into the bore of the hollow through hole of the inner ferrule front section e.g. from about 0.1 µm larger to about 2 mm larger, such as from about 1 µm larger to about 1 mm larger, such as from about 0.1 mm larger to about 0.01 mm larger in diameter.

Advantageously the alignment sleeve surrounds the PCF proximally to the first fiber end. Preferably the first fiber end and an end of the alignment sleeve are aligned in a plane perpendicular to the PCF center axis.

The alignment sleeve may in principle have any length (determined in axial direction), such as up to the length of the inner ferrule front section. In practice it is desired that the alignment sleeve is relatively short, but sufficiently long to ensure a support of the electromagnetic force. Advantageously, the alignment sleeve has a length in the axial direction which is least about 1 mm, such as from about 2 mm to about 5 cm, such as from about 5 mm to about 2 cm. It has been found that for most PCF assemblies the optimal length of the alignment sleeve is about 10 mm.

In an embodiment the alignment sleeve supports the first fiber end section by having an inner diameter at least along a support section thereof which is adapted to the outer diameter of the first fiber end section. In this embodiment it is desired that the inner diameter of the support section of the alignment sleeve is up to about 0.5 mm larger than the inner diameter, such as up to about 0.1 mm, such as up to about 0.01 mm. Where the alignment sleeve is crimped or collapsed onto the first fiber end section, the inner diameter of the alignment sleeve in non-collapsed or non-crimped state may be larger, such as up to about 5 mm larger than the PCF diameter, such as up to about 3 mm larger, such as up to about 1 mm larger than the PCF diameter.

In an embodiment the inner ferrule front section supports the first fiber end section via the alignment sleeve and by mechanically holding the alignment sleeve in axial position, and an end of the alignment sleeve and an end of the inner ferrule front section are aligned in a plane perpendicular to the ferrule structure center axis. Preferably the first fiber end, the end of the alignment sleeve and the end of the inner ferrule front section are aligned in a plane perpendicular to the PCF center axis.

In the assembling of the ferrule the alignment sleeve is moved in the z-direction to achieve the desired position of the fiber facet in the z-direction, e.g. relative to an outer ferrule reference point. Hereby you ensure that the desired optical focal point in the ferrule is achieved. Subsequently, prior to or simultaneously the fiber is anchored on the rear inner ferrule section.

In an embodiment the inner ferrule front section supports the first fiber end section proximally to the first fiber end directly—with an alignment sleeve—and preferably by mechanically holding the first fiber end section proximally to the first fiber end in axial position. Preferably an end of the inner ferrule front section and the first fiber end are aligned in a plane perpendicular to the PCF center axis. Advantageously is desired that the inner diameter of the inner ferrule front section is up to about 0.5 mm larger than the inner diameter, such as up to about 0.1 mm, such as up to about 0.01 mm.

In practical usage, some fraction of light at a light exiting end of the PCF may be guided in the cladding as cladding modes e.g. due to reflected and/or incident radiation further at the input end of the PCF some fraction of light focused into and transmitted in a PCF fiber may not be guided by the core but may be guided as cladding modes e.g. due to mismatch of beam parameters into the fiber, focusing lens imperfections and dust/imperfections on optical surfaces and similar. These cladding modes may result in a very high temperature when used for high power transmission. And in particular the temperature at the termination end of the PCF enclosed within the ferrule structure may become excessively high, which may damage a polymer coating of the PCF and thereby damage the whole termination and the fixation between the ferrule structure and the PCF.

The component of the incident radiation that is not coupled into the core will propagate within the cladding until it diverges to the protective polymer coating where it is removed ("stripped"). If the source of laser radiation input into the fiber is a high power laser, the intensity of radiation within these cladding modes is readily capable of burning the protective polymer coating and destroying the fiber. An example is laser radiation onto industrial workpiece targets (particularly metallic targets) that is reflected with substantial power back toward the fiber such that radiation couples into the cladding circumference rather than into the core of the fiber. For this reason it is necessary to remove any cladding mode radiation at all fiber terminations before it can possibly diverge to and destroy the protective polymer coating. "Mode stripping" is the name given to the numerous techniques used to remove such cladding modes.

This problem has been solved by an embodiment of the invention wherein the PCF is free of polymer from its anchoring length section to the inner ferrule rear section and to its first fiber end. In an embodiment the ferrule structure comprises a hermetic solder element arranged to surround the first fiber end section to form an annular hermetic seal between the first fiber end section and the inner ferrule rear section. The hermetic solder element is arranged closer to the front annular section than the anchor length section of the inner ferrule rear section. Further the anchoring length section of the inner ferrule rear section is preferably not fully annular, thereby allowing heat to dissipate from the PCF at the anchoring length section and preferably to the hermetic solder element. The anchoring length section of the inner ferrule rear section is preferably extending from about 20 degrees to about 350 degrees, such as about 180 degrees (semi-annular) around the PCF.

The hermetic solder element additionally serves to protect the first fiber end from dust and other undesired contamination. Where the PCF assembly comprises an end cap, the hermetic solder element ensures a hermetic seal of the first fiber end section from the first fiber end and to the position in z-direction of the hermetic solder element. Any polymer coating of the PCF is advantageously stripped off the first fiber end section from the first fiber end and to the position in z-direction of the hermetic solder element.

In an embodiment the first fiber end section is mounted in said ferrule structure substantially without application of pressure to the PCF. The application of pressure to the PCF may generate stress in the fiber, which for many applications is highly undesired because the beam quality may be of low quality or the stress may even damage the PCF or lower the lifetime of the PCF.

In an embodiment the first fiber end section is mounted in said ferrule structure without any direct bonds to the fiber beyond one or more bonds to the inner ferrule rear section including the anchoring.

In an embodiment the PCF is free of polymer coating in the first fiber end section from the anchoring section of the inner ferrule rear section to the first fiber end.

Advantageously the inner ferrule front section is of an at least partly transparent material at a wavelength between about 200 nm and about 4 µm, e.g. fused or crystallized quartz, and the inner ferrule rear section is of fused or crystallized quartz or of a metal or alloy. In an embodiment the inner ferrule front section is of substantially undoped silica having a refractive index of up to 1.45 for light at 1 µm.

Generally it is desired that the inner ferrule rear section is of a material with a high conductivity and low thermal expansion in order to ensure a high heat dissipation. It is therefore in particularly desired that the inner ferrule rear section is of a metal or metal alloy, such as Colsibro® which is a high copper alloy with small additions of nickel and silicon, which serves to increase the strength, hardness and wear resistance of the material.

The outer ferrule arrangement primarily has the function of holding the inner ferrule arrangement section in position relative to each other, but advantageously the outer ferrule arrangement also aids in the heat dissipation from the ferrule structure.

Advantageously the outer ferrule arrangement is of metal, ceramic or glass e.g. silica.

In an embodiment the outer ferrule arrangement is at least partly transparent to allow light to escape to an optional outer alignment jacket where it may be absorbed. In particular light from cladding modes are allowed to escape via the outer ferrule arrangement, optionally cladding mode light stripped off as explained further below is allowed to escape via the outer ferrule arrangement.

In an embodiment the outer ferrule arrangement is fixed to each of the inner ferrule front section and the inner ferrule rear section of the inner ferrule arrangement to hold them in a fixed position relative to each other, such that the first fiber end section of the PCF is preferably supported to be substantially straight within the ferrule structure. The outer ferrule arrangement is preferably fixed to the inner ferrule arrangement by glue, by solder and/or by being fused or laser welded.

The PCF assembly may advantageously comprise an end cap arrangement e.g. for protecting the first fiber end against dust, moisture and similar contaminations. In an embodiment the ferrule structure comprises an end cap arranged in front of the first fiber end. The end cap may be mounted with a distance or without a distance to the inner ferrule front section depending on the structure and the intended use of the PCF. The end cap is preferably fixed directly to the inner ferrule front section or to an outer ferrule front section of the outer ferrule arrangement as described further below.

In an embodiment the end cap is fixed to the outer ferrule front section of the outer ferrule arrangement. In this embodiment the outer ferrule arrangement preferably comprises the outer ferrule front section and outer ferrule rear section, wherein the outer ferrule rear section is fixed to both the inner ferrule rear section and the inner ferrule front section to hold these inner ferrule arrangement sections in relative positions and the outer ferrule front section is fixed to the inner ferrule front section and the end cap, thereby holding the end cap in position relative to the first fiber end.

The end cap may be as prior art end caps e.g. with or without focusing elements. Advantageously the end cap is an anti-reflection coated silica end cap. Where the end-cap is mounted with a distance to the first fiber end it is desired that the end cap comprises an anti-reflection coating on both sides. This is in particular desired where the PCF is a hollow core PCF.

In an embodiment the end cap is a lens. Preferably the lens comprises an antireflective coating on both of its sides i.e. its side facing the first fiber end and its opposite side.

The PCF may in principle be any kind of PCF, such as the PCFs discussed in the introduction above. In an embodiment the PCF is selected from a hollow core fiber, such as a bandgap fiber, a kagome fiber, or an anti-resonant-reflection (ARS) fiber, or a solid core fiber.

In an embodiment the PCF has a core diameter of less than 100 µm, preferably of about 50 µm or less, such as from about 5 µm to about 40 µm.

In an embodiment the PCF at its first fiber end section comprises a terminal section of a hollow capillary fiber for protecting the end of the PCF from back reflections. This is achieved by positioning a piece of hollow capillary fiber in front of the PCF, e.g. in the alignment sleeve or in the inner ferrule front section.

In an embodiment the first fiber end (facet) has a metallic or anti-reflex coating.

In an embodiment the PCF is a hollow core fiber and the end cap is fixed to the outer ferrule front section of the outer ferrule arrangement to provide an end cap space between the end cap and the inner ferrule front section. The cap space may in principle be very small determined in the z-direction, such a 1 mm and up to e.g. 5 cm. In practice the cap space is kept below about 1 cm for practical reasons.

In an embodiment the hollow core has a collapsed end part (such as up to 2 mm in length, preferably up to 1 mm in length) and a metallic or anti-reflex coating on the fiber facet. In an embodiment the inner ferrule arrangement comprises a passage into the end cap space for injecting and/or withdrawing fluids, and in particular gas. The passage is preferably provided by at least one additional through hole in each of the inner ferrule front section and the inner ferrule rear section. The additional through holes are preferably substantially parallel to the axis of the ferrule structure. Preferably the additional through hole comprises a valve arrangement at an exit from the inner ferrule rear section.

The passage into the end cap space for injecting and/or withdrawing fluids may advantageously be applied for injecting or flushing with suitable gasses e.g. to ensure a moisture free hollow core. Suitable gasses include air, argon, nitrogen or mixtures comprising any of the mentioned gasses. Optionally, the cap space for injecting and/or withdrawing fluids are arranged for generating a hollow core pressure of about 1 mbar or less, such as to a pressure of about 0.1 mbar or less, such as to a pressure of about of 0.01 mbar or less at standard temperature.

Optionally the cap space for injecting and/or withdrawing fluids are arranged for generate a hollow core pressure of up to 2 bars, such as up to about 1.5 bars at standard temperature.

In an embodiment the inner ferrule arrangement comprises at least one passage into the gap between the inner ferrule front section and the inner ferrule rear section. The passage is advantageously a passage through the inner ferrule rear section, preferably in the form of a through hole e.g. parallel to the center axis of the ferrule structure. The injecting and/or withdrawing of fluids, such as injecting and/or withdrawing of the gasses mentioned above. In an embodiment the inner ferrule arrangement comprises at least two passages into the gap between the inner ferrule front section and the inner ferrule rear section for flushing the gap e.g. for drying out the gap and/or for heat dissipation.

In an embodiment the inner ferrule front section has a rear end where at least an in radial direction outer part of the rear end is angled relative to the center axis of the ferrule structure to out-couple light, such as light propagating in the inner ferrule arrangement. In an embodiment the inner ferrule front section has a rear end where at least an in radial direction outer semi annular or annular in radial direction outer part of the rear end is angled relative to the center axis of the ferrule structure to out-couple light. The light may advantageously be out-coupled to pass through the outer ferrule arrangement.

In an embodiment the inner ferrule front section has a rear end where at least an in radial direction inner part of the rear end is angled relative to the center axis to form a funnel shape. Thereby the PCF may be simpler to mount in the inner ferrule front section. The rear end of the inner ferrule front section may be angled in a part of its extension around the fiber or in its whole annular extension around the PCF.

The rear end of the inner ferrule front section may advantageously be coated with a reflective coating to back-reflect light, such as light which is incidentally radiated from the first fiber end and/or light that is propagating in the inner ferrule arrangement.

In an embodiment the inner ferrule front section has a front end and the front end is coated with a reflective coating to protect the ferrule structure against incident and/or back reflected light.

In an embodiment the inner ferrule rear section has a front end, the front end is angled relative to the center axis of the ferrule structure and/or the front end is coated with a reflective coating to protect against incident and/or back reflected light. The front end of the inner ferrule rear section may be angled in a part of its extension around the fiber or in its whole annular extension around the PCF.

As explained above the ferrule structure of the PCF assembly of the invention allows for several functions of stripping off undesired cladding modes by reflecting and directly stripping off such cladding modes. As explained in the following the invention allow for even further functions of stripping off undesired light.

In an embodiment the first fiber end section has at least one mode stripper length section. The mode stripper length section comprises a mode stripping high index material and or/a scattering layer applied in contact with the optical fiber at the mode stripper length section and/or the fiber in the mode stripper length section has a roughness Ra value of at least about 0.1 µm.

The high roughness Ra value may e.g. be provided by etching (e.g. laser etching or chemical etching) or mechanical grinding. The Ra-value may be measured in accordance with the ISO 4287, DIN 4762 and/or DIN 4768 standards.

The mode stripper length section reduces or fully prevents forward propagating cladding light. The mode stripping high index material may for example be glue with silica particles e.g. doped to increase the refractive index and/or chemical glass.

In an embodiment the mode stripper length section of the PCF is positioned between the inner ferrule front section and the inner ferrule rear section.

In an embodiment at least one of the inner ferrule front section and the inner ferrule rear section has a carving exposing the PCF the mode stripper length section of the PCF.

Advantageously the carving preferably partly surrounds the fiber preferably such that it extends at least about 20 degrees and e.g. up to about 350 degrees, preferably from about 20 degrees to about 90 degrees in the direction around the PCF.

In an embodiment the ferrule structure comprises a mode stripper coating arranged in direct contact with an outer surface of the inner ferrule front section, the mode stripper coating is preferably contained between the inner ferrule front section and the outer ferrule arrangement.

In an embodiment the ferrule structure comprises an outer alignment jacket surrounding the outer ferrule arrangement, the outer alignment jacket preferably comprises means for alignment, preferably for alignment in axial direction (z-direction) and/or for rotational alignment.

The main purpose of the outer alignment jacket is to ensure a rigid and mechanical strength of the ferrule structure and simpler alignment of the PCF with respect to an emitted beam or in-coupled beam of light. Further for axial and rotational alignment the outer alignment jacket is very beneficial.

In an embodiment the means for alignment comprises means for alignment in the axial direction (z-direction), for alignment in the radial directions (x,y-directions) and/or for rotational alignment.

Advantageously the means for alignment comprises one or more flanges, one or more protrusions, one or more depressions and/or one or more markings.

Preferably the means for alignment comprises a flange for mounting with positioning control.

In an embodiment the means for alignment comprises a marker for rotational fiber orientation e.g. for PM orientation.

Generally it is desirable to be able to rotate the fiber in the ferrule so that the PM axis is aligned with respect to the means for alignment on the outside of the ferrule). This may e.g. be provided by having a corresponding marking on the inner ferrule rear section immediately adjacent to the anchor length section.

In an embodiment the ferrule structure is configured for cooling by a cooling fluid the outer ferrule arrangement and/or the outer alignment jacket comprises passages with at least one inlet and at least one exit for the cooling fluid, such as water. The passages in the outer ferrule arrangement and/or the outer alignment jacket are advantageously arranged to helically surround the underlying element(s) to provide good heat dissipation. By ensuring that the outer ferrule arrangement is transparent to light stripped off and/or out-coupled via the inner ferrule arrangement, this light may escape via the outer ferrule arrangement and be absorbed by outer alignment jacket. Thereby the outer alignment jacket will be heated, but due to the cooling of the outer alignment jacket by a cooling fluid, the temperature may be held at an acceptable level even when the PCF is transporting light at high power.

In an embodiment the assembly further comprises one or more sensors, such as one or more optical sensors and/or electrical sensors and/or chemical sensors for monitoring temperature, for monitoring connector performance and/or for monitoring fiber damage. The sensors are advantageously arranged in the ferrule structure, such as the outer ferrule arrangement and/or the outer alignment jacket. Advantageously the sensors are fiber sensors, but in principle also non-fiber sensors are applicable.

In an embodiment the assembly comprises a second ferrule structure connected to a second end section of the PCF comprising a second fiber end. The second ferrule structure preferably is as the ferrule structure as described above and is mounted to the second end section of the PCF in a corresponding way as described above. In an embodiment the second end of the PCF is a fiber spliced end and/or it is coupled comprising free space coupling.

The invention also comprises a laser system comprising a PCF assembly as described above.

The laser system advantageously comprises a laser light source and the PCF assembly is optically connected to the laser light source for receiving light from the laser light source. The laser light source may in an embodiment be arranged for directly feed the light to the PCF e.g. by being fused to the PCF. In an embodiment the laser light source is arranged for feeding the light to the PCF via one or more optical elements and/or via free space.

Preferably the PCF assembly is adapted for delivering the light to a light employing station of an apparatus. Preferably the first fiber end with the ferrule structure is adapted for being connected to the user apparatus.

The apparatus is for example a microscope, surgical apparatus, measuring apparatus (metrology), materials processing apparatus, an illumination apparatus, any combinations thereof and/or an apparatus as described further below.

The laser light source may in principle be any kind of laser light source, such as a CW laser light source or a pulsed laser light source. Such laser light sources are well known in the art and will not be described in further details herein.

In an embodiment the laser light source is configured for generating laser light pulses, preferably the laser light source is a femtosecond laser source or a picosecond laser light source or a nanosecond laser light source.

In an embodiment the laser light source has a pump duration of from about 30 fs to about 30 ps, such as from about 100 fs to about 10 ps.

In an embodiment the laser light source has a peak power determined at the exit of the laser light source which is at least about 5 kW, such as at least about 10 kW, such as at least about 30 kW, such as at least about 50 kW.

The laser light source is advantageously a mode-locked laser light source. In an embodiment laser light source is an actively mode locked laser. In an embodiment the laser light source is a passively mode locked laser. The mode locked laser preferably comprises one or more amplifiers.

In an embodiment the laser system is configured for supercontinuum generation and the laser light source is a mode-locked pump pulse light source arranged for feeding the PCF to generate supercontinuum. The PCF is preferably a solid core PCF suitable for supercontinuum generation such as a PCF described in WO15144181, WO15003715, WO15003714, US2015192732 and/or US2011013652.

In an embodiment where the PCF is a solid core PCF, it is desired that the PCF is a microstructured solid core PCF comprising a plurality of non-solid and/or solid cladding inclusions. The solid core PCF is preferably configured for guiding light—preferably single mode light—comprising at least one wavelength in the range from about 200 nm to about 4.5 µm, preferably at least one wavelength in the range from 1000 nm to about 1100 nm.

In an embodiment the PCF is a hollow core PCF, preferably the hollow core PCF is configured for guiding light—preferably single mode light—comprising at least one wavelength in the range from about 200 nm to about 4.5 µm, preferably at least one wavelength in the range from 1000 nm to about 1100 nm.

In an embodiment the PCF is configured for guiding a continuum of light wavelengths, preferably spanning over at least about 0.1 µm, such as at least about 0.3 µm, such as at least about 0.5 µm.

In an embodiment the hollow core PCF comprises an outer cladding region and a number N of hollow tubes surrounded by the outer cladding region, wherein each of the hollow tubes is fused to the outer cladding to form a ring defining an inner cladding region and the hollow core region surrounded by the inner cladding region, preferably N is from 6 to 12, more preferably N is 7. Advantageously the hollow tubes are not touching each other, preferably the hollow tubes are arranged with a substantially equal distance to adjacent hollow tubes.

The hollow core PCF is advantageously as described in the co-pending application PA 2015 70877 DK by the same applicant and with the title "HOLLOW CORE OPTICAL FIBER AND A LASER SYSTEM".

The PCF of the laser system advantageously has a core region diameter of from about 3 µm to about 100 µm, such as from about 10 µm to about 50 µm, such as from about 10 µm to about 30 µm.

The invention also comprises a set of correlated ferrule elements suitable for a PCF assembly as described above.

The set of correlated ferrule element comprises the required elements for providing a ferrule structure for a PCF to generate a PCF assembly as described above.

The set of correlated ferrule elements comprises
an inner ferrule front section and an inner ferrule rear section for forming an inner ferrule arrangement; and
an outer ferrule arrangement,
wherein each of the inner ferrule front section, inner ferrule rear section and outer ferrule arrangement has a length and a center axis and comprises a main hollow through hole parallel with or coincident to the respective center axes, the set of correlated ferrule elements preferably further comprises an alignment sleeve having a length and a center axis and comprises a main hollow through hole parallel with or coincident to the center axis.

Advantageously the elements are correlated such that the alignment sleeve can be positioned in the main hollow through hole of the inner ferrule front section and the inner ferrule front section and the inner ferrule rear section can be mounted in the main hollow through hole of the outer ferrule arrangement for forming the inner ferrule arrangement. Thereby the set of correlated ferrule elements may be assembled with a PCF to a PCF assembly.

The alignment sleeve is advantageously a capillary tube wherein the main hollow through hole of the alignment sleeve is has an inner diameter which is about 2 mm or less, such as about 1 mm or less such as about 0.5 mm or less, the alignment sleeve is preferably collapsible in at least a part of its length as described above.

The alignment sleeve may advantageously be as described above and of a material as described above.

In an embodiment the alignment sleeve has a length in axial direction which is preferably at least about 1 mm, such as from about 2 mm to about 5 cm.

The inner ferrule front section and the inner ferrule rear section as well as the outer ferrule arrangement are advantageously as described above and of materials as described above.

In an embodiment the set further comprises an end cap which is configured for being arranged in front of the inner ferrule front section by being mounted to the inner ferrule front section or by being mounted to an outer ferrule front section of the outer ferrule arrangement. The end cap is preferably an anti-reflection coated silica end cap e.g. as described above.

In an embodiment each of the inner ferrule front section and the inner ferrule rear section comprises one or more additional through holes for providing a fluid passage, the additional through holes are preferably substantially parallel to the axis of the respective inner ferrule sections and optionally the additional through hole at an exit from the inner ferrule rear section comprises a valve arrangement e.g. as described above.

In an embodiment the inner ferrule front section has a rear end, at least an in radial direction outer part of the rear end is angled relative to the center axis of the inner ferrule front section and/or the rear end is coated with a reflective coating in order to out-couple light preferably as described above.

In an embodiment the inner ferrule front section has a rear end, at least an in radial direction inner part of the rear end is angled relative to the center axis to form a funnel shape to thereby make it simpler to insert the PCF into the inner ferrule front section e.g. as described above.

Advantageously the inner ferrule front section has a front end, the front end is coated with a reflective coating.

In an embodiment the inner ferrule rear section has a front end and the front end is angled relative to the center axis of the inner ferrule rear section and/or the front end is coated with a reflective coating, preferably as described above.

In an embodiment at least one of the inner ferrule front section and the inner ferrule rear section has a carving into its main hollow through hole, the carving preferably has an extension in an annular direction which extends at least about 20 degrees such as up to about 350 degrees, such as up to about 90 degrees.

In an embodiment the set further comprises an outer alignment jacket correlated to the outer ferrule arrangement such that it can be arranged to surround the outer ferrule arrangement e.g. as described above. The outer alignment jacket preferably comprises means for alignment e.g. as described above.

Advantageously the outer ferrule arrangement and/or the outer alignment jacket comprises passages with at least one inlet and at least one exit for a cooling fluid e.g. as described above.

The invention also comprises an apparatus comprising a laser system as described above, wherein the PCF assembly is configured for delivering light to a light receiving station of the apparatus.

The apparatus may in principle be any kind of apparatus, which uses laser light in its operation. In an embodiment the apparatus is an illumination apparatus configured for illuminating a target, the illumination apparatus is preferably selected from a microscope, a spectroscope or an endoscope.

In an embodiment the illumination source is adapted for fluorescence Imaging; Fluorescence Lifetime Imaging (FLIM); Total Internal Reflection Fluorescence (TIRF) Microscopy; fluorescence resonance energy transfer (FRET); pulse interleave excitation foster resonance energy transfer (PIE-FRET); broadband Spectroscopy; nanophotonics; flow cytometry; industrial inspection, such as metrology; ringdown spectroscopy, such as gas sensing; analytical spectroscopy, such as hyperspectral spectroscopy, crop analysis e.g. of fruits and time of flight spectroscopy (TCSPC); single Molecule Imaging and/or combinations thereof.

In an embodiment the apparatus is a microprocessing apparatus, preferably for material processing, such as drilling, marking, cutting and/or scribing.

In an embodiment the apparatus is a surgery apparatus, such as an apparatus for eye surgery (ophthalmology).

All features of the inventions and embodiments of the invention as described above including ranges and preferred ranges can be combined in various ways within the scope of the invention, unless there are specific reasons not to combine such features.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings.

FIG. 7 is a cross sectional view of a seventh embodiment of a PCF assembly according to the invention, where the PCF at its first fiber end section has a mode stripper section in the gap between the inner ferrule front section and the inner ferrule rear section.

FIG. 8 is a cross sectional view of an eighth embodiment of a PCF assembly according to the invention, where the PCF assembly comprises an end cap mounted to the inner ferrule front section.

FIG. 9a is a cross sectional view of a ninth embodiment of a PCF assembly according to the invention, where the PCF assembly comprises an end cap mounted to the outer ferrule front section.

FIG. 9b is a cross sectional view of a PCF assembly which is a variation of the ninth embodiment shown in FIG. 9a.

FIG. 11 is a cross sectional view of an eleventh embodiment of a PCF assembly according to the invention, where the PCF assembly comprises an alignment sleeve.

FIG. 12a is a cross sectional view of a twelfth embodiment of a PCF assembly according to the invention, where the PCF assembly comprises an alignment sleeve and the PCF comprises a section of hollow core capillary.

FIG. 12b is a cross sectional view is an enlarged cross sectional view of the alignment sleeve and supported first fiber end section of the PCF assembly of FIG. 12a.

FIG. 13a is a cross sectional view of a thirteenth embodiment of a PCF assembly according to the invention, where the PCF assembly comprises an alignment sleeve with a collapsed supporting section.

FIG. 13b is a cross sectional view is an enlarged cross sectional view of the alignment sleeve and supported first fiber end section of the PCF assembly of FIG. 13a.

The figures are schematic and may be simplified for clarity. Throughout, the same reference numerals are used for identical or corresponding parts.

DETAILED DESCRIPTION

Figure 1:
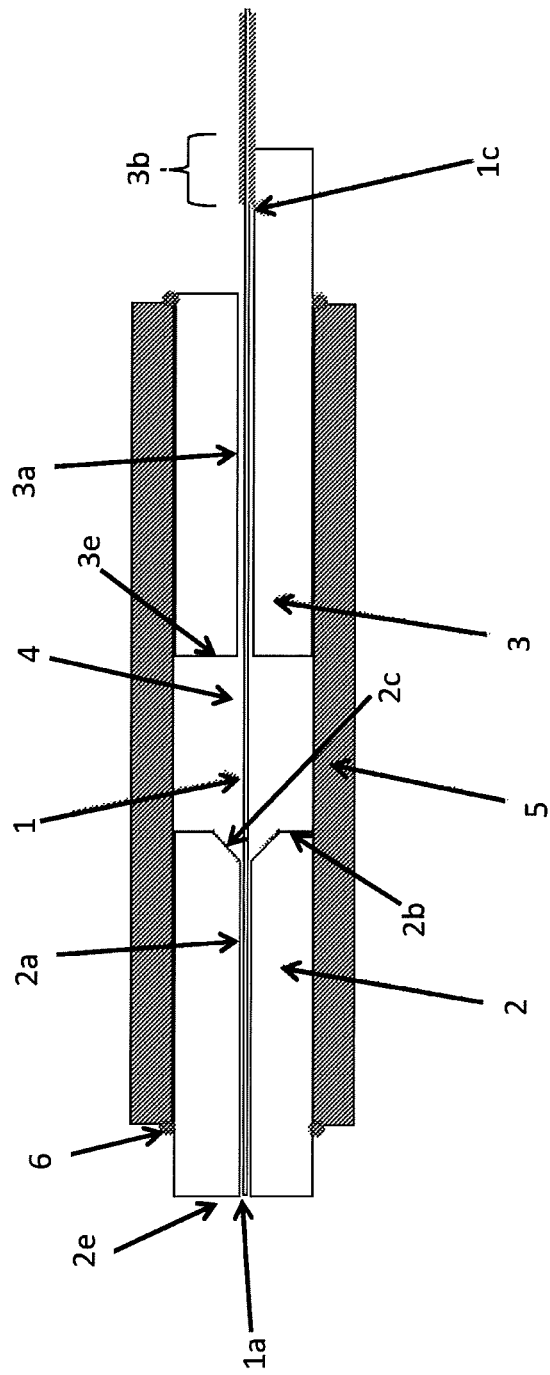
FIG. 1 is a cross sectional view of a first embodiment of a PCF assembly according to the invention, where in radial direction inner part of said rear end is angled relative to the center axis to form a funnel shape.

The PCF assembly of FIG. 1 comprises a photonic crystal fiber (PCF) assembly PCF with a first fiber end section 1 with a first fiber end 1a and a ferrule structure. The ferrule structure comprises an inner ferrule arrangement comprising an inner ferrule front section 2 proximally to the first fiber end and 1a an inner ferrule rear section 3 distally to first fiber end 1a. The inner ferrule front section 2 and the inner ferrule rear section 3 respectively comprises hollow through holes 2a, 3a coincident with center axes of the inner ferrule front section 2 and inner ferrule rear section. The PCF first fiber end section is mounted in said hollow through holes 2a, 3a, such that the inner ferrule arrangement surrounds the first fiber end section.

The inner ferrule rear section 3 is anchored in an anchor length section 3b to said first fiber end section 1, and from a point 1c of the PCF and to the first fiber end the PCF is free of polymer coating. The inner ferrule front section 2 supports the first fiber end section 1 proximally to the first fiber end 1a by mechanically holding said first fiber end section proximally to the first fiber end in axial position. As it can be seen the front of the inner ferrule front section and the first fiber end are aligned in a plane perpendicular to the PCF center axis.

The ferrule structure further comprises an outer ferrule arrangement 5 arranged to surround the inner ferrule arrangement. The outer ferrule arrangement 5 is fixed to each of the inner ferrule front section 2 and the inner ferrule rear section 3 to hold them in a fixed position relative to each other and to form a gap 4 there between. The outer ferrule arrangement 5 is fixed by solder 6 at each of its ends to the respective sections 2, 3 of the inner ferrule arrangement.

The PCF first fiber end section is advantageously held relatively straight in the gap 4 between the inner ferrule front section 2 and the inner ferrule rear section 3. In an alternative not shown embodiment the PCP has a surplus length between the inner ferrule front section 2 and the inner ferrule rear section 3.

The in radial direction inner part 2c of the rear end of the inner ferrule front section 2 is angled relative to the center axis to form a funnel shape, which makes it simpler to feed the PCF 1 into the inner ferrule front section during assembling. The in radial direction outer part 2d of the rear end of the inner ferrule front section 2 is advantageously coated with angled reflective coating to back-reflect light propagating in the inner ferrule arrangement.

Further the front end 2e of the inner ferrule front section 2 is preferably coated with a reflective coating to protect the ferrule structure against incident and/or back-reflected light and the front end 3e of the inner ferrule rear section is preferably coated with a reflective coating to protect against incident and/or back-reflected light.

Figure 2:
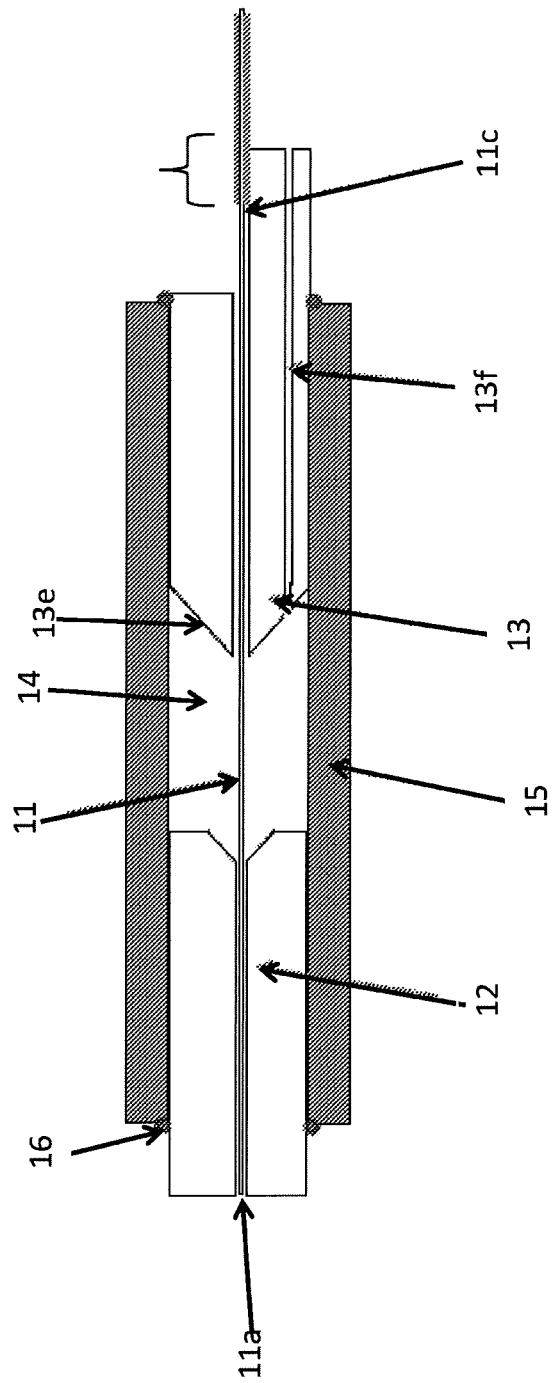
FIG. 2 is a cross sectional view of a second embodiment of a PCF assembly according to the invention, where the inner ferrule rear section has a passage into the gap between the inner ferrule front section and the inner ferrule rear section.

The PCF assembly of FIG. 2 comprises a photonic crystal fiber (PCF) assembly PCF with a first fiber end section 11 with a first fiber end 11a and a ferrule structure. The ferrule structure comprises an inner ferrule arrangement comprising an inner ferrule front section 12 proximally to the first fiber end and 11a an inner ferrule rear section 13 distally to first fiber end 11a. The inner ferrule rear section 13 is anchored in an anchor length section 13b to the first fiber end section 11, and from a point 11c of the PCF and to the first fiber end the PCF is free of polymer coating. The ferrule structure further comprises an outer ferrule arrangement 15 arranged fixed to each of the inner ferrule front section 12 and the inner ferrule rear section 13 to hold them in a fixed position relative to each other. The front end 3e of the inner ferrule rear section is preferably coated with a reflective coating to protect against incident and/or back-reflected light.

The front end 13e of the inner ferrule rear section 13 is angled relative to the center axis of the ferrule structure to form an outwards facing facet for out-coupling ferrule light. The outer ferrule arrangement 15 is preferably substantially transparent to the out-coupled light. The inner ferrule rear section 13 further comprises a passage 13f into the gap 14 between the inner ferrule front section 12 and the inner ferrule rear section 15. The passage may be used to fill in or withdraw fluids from the gap 14 as described above.

Figure 3:
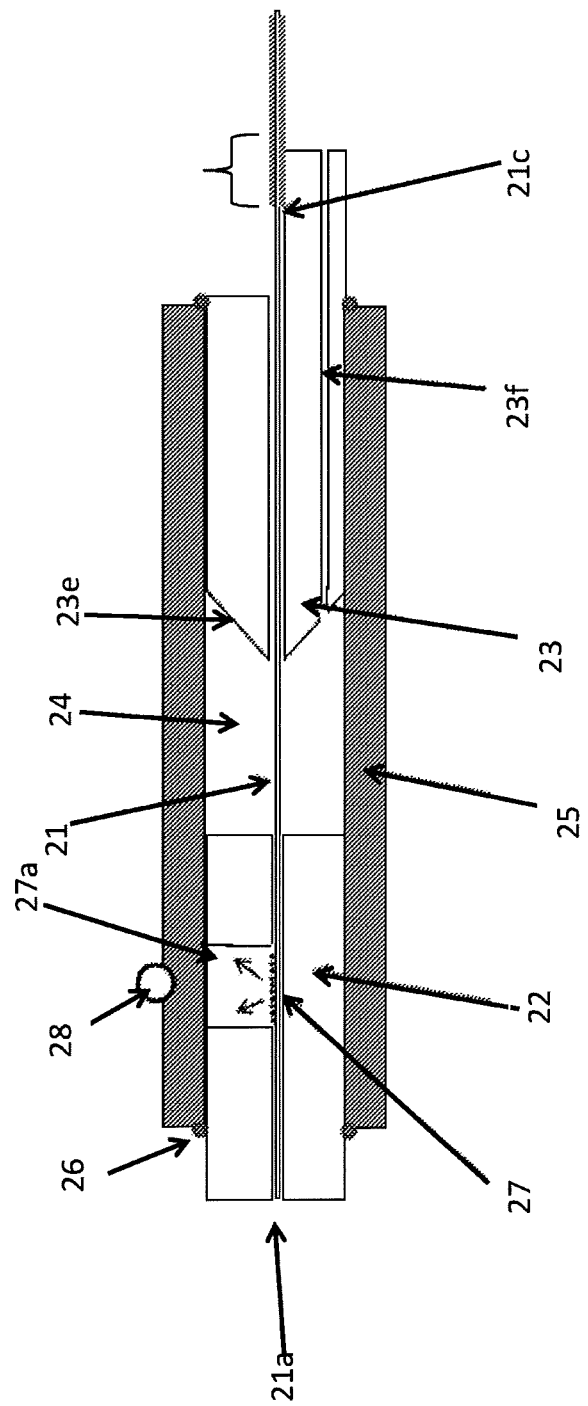
FIG. 3 is a cross sectional view of a third embodiment of a PCF assembly according to the invention, where the PCF at its first fiber end section has a mode stripper section and the inner ferrule front section has a carving exposing the PCF said mode stripper length section.

The PCF assembly of FIG. 3 comprises a photonic crystal fiber (PCF) assembly PCF with a first fiber end section 21 with a first fiber end 21a and a ferrule structure. The ferrule structure comprises an inner ferrule arrangement comprising an inner ferrule front section 22 proximally to the first fiber end 21a and an inner ferrule rear section 23 distally to first fiber end 21a and surrounding the first fiber end section 21.

The inner ferrule rear section 23 is anchored in an anchor length section 23b to said first fiber end section 21, and from a point 21c of the PCF and to the first fiber end the PCF is free of polymer coating. The inner ferrule front section 22 supports the first fiber end section 21 proximally to the first fiber end 21a by mechanically holding said first fiber end section proximally to the first fiber end in axial position.

The ferrule structure further comprises an outer ferrule arrangement 25 fixed to each of the inner ferrule front section 22 and the inner ferrule rear section 23 to hold them in a fixed position relative to each other and to form a gap 24 there between. The outer ferrule arrangement 25 is fixed by solder 26 at each of its ends to the respective sections 22, 23 of the inner ferrule arrangement.

The front end 23e of the inner ferrule rear section 23 is angled relative to the center axis of the ferrule structure to form an outwards facing facet for out-coupling light propagating in the inner ferrule arrangement and reduce back reflections. The inner ferrule rear section 23 further comprises a passage 23f into the gap 24 between the inner ferrule front section 22 and the inner ferrule rear section 25. The passage may be used to fill in or withdraw fluids from the gap 24 as described above. The PCF at its first fiber end section 21 has a mode stripper section 27 and the inner ferrule front section 22 has a carving 27a exposing the PCF mode stripper length section 27.

A sensor 28 is mounted to the outer ferrule arrangement 25 above the carving 27a exposing the PCF mode stripper length section for monitoring the out-coupling efficiency of the mode stripper 27.

Figure 4:
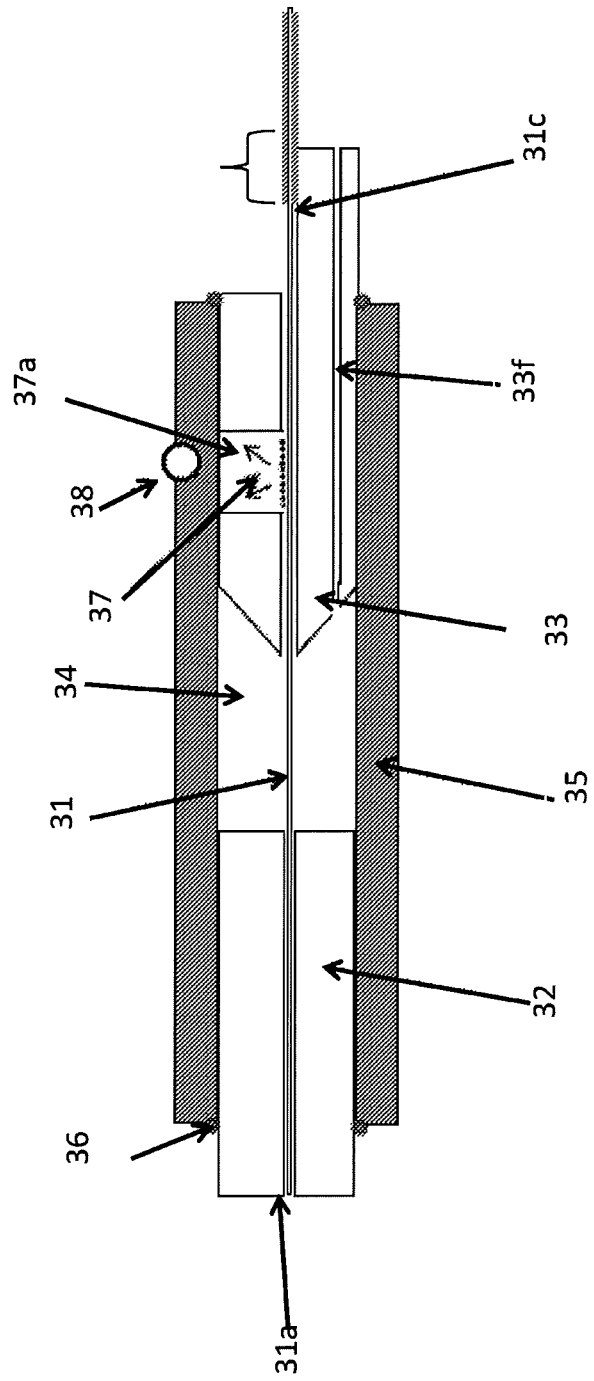
FIG. 4 is a cross sectional view of a fourth embodiment of a PCF assembly according to the invention, where the PCF at its first fiber end section has a mode stripper section and the inner ferrule rear section has a carving exposing the PCF said mode stripper length section.

The PCF assembly of FIG. 4 comprises a photonic crystal fiber (PCF) assembly PCF with a first fiber end section 31 assembled with a ferrule structure comprising an inner ferrule arrangement comprising an inner ferrule front section 32 proximally to the first fiber end and an inner ferrule rear section 33 distally to first fiber end and surrounding the first fiber end section 31.

The inner ferrule rear section 33 is anchored to the first fiber end section 31, and from a point 31c of the PCF and to the first fiber end the PCF is free of polymer coating. The inner ferrule front section 32 supports the first fiber end section 31 proximally to the first fiber end 31a by mechanically holding said first fiber end section proximally to the first fiber end in axial position.

The ferrule structure further comprises an outer ferrule arrangement 35 fixed to each of the inner ferrule front section 32 and the inner ferrule rear section 33 to hold them in a fixed position relative to each other and to form a gap 34 there between. The outer ferrule arrangement 35 is fixed by solder 36 at each of its ends to the respective sections 32, 33 of the inner ferrule arrangement.

The PCF at its first fiber end section 31 has a mode stripper section 37 and the inner ferrule rear section 33 has a carving 37a exposing the PCF mode stripper length section 37.

A sensor 38 is mounted to the outer ferrule arrangement 35 above the carving 37a exposing the PCF mode stripper length section for monitoring the out-coupling efficiency of the mode stripper 37.

Figure 5:
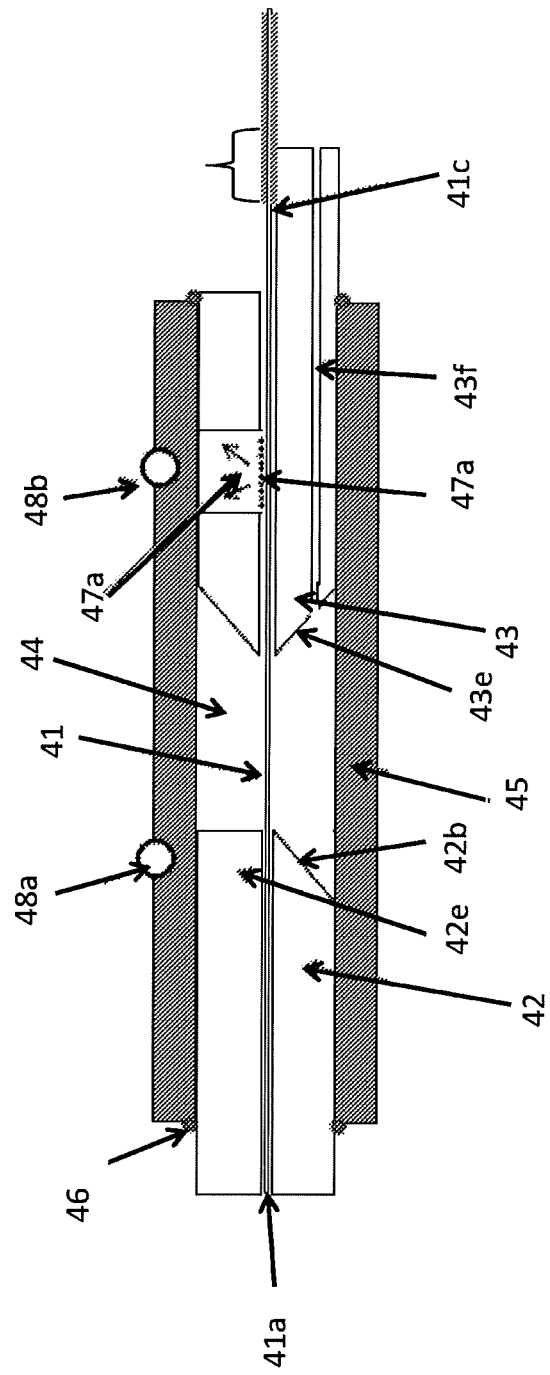
FIG. 5 is a cross sectional view of a fifth embodiment of a PCF assembly according to the invention, where a part of the rear end of the inner ferrule front section is angled relative to the center axis of the ferrule structure to out-couple light propagating in the inner ferrule arrangement.

The PCF assembly of FIG. 5 comprises a photonic crystal fiber (PCF) assembly PCF with a first fiber end section 41 assembled with a ferrule structure comprising an inner ferrule arrangement comprising an inner ferrule front section 42 proximally to the first fiber end and an inner ferrule rear section 43 distally to first fiber end and surrounding the first fiber end section 41.

The inner ferrule rear section 43 is anchored to the first fiber end section 41, and from a point 41c of the PCF and to the first fiber end the PCF is free of polymer coating. The inner ferrule front section 42 supports the first fiber end section 41 proximally to the first fiber end 41a by mechanically holding said first fiber end section proximally to the first fiber end in axial position.

The ferrule structure further comprises an outer ferrule arrangement 45 fixed to each of the inner ferrule front section 42 and the inner ferrule rear section 43 to hold them in a fixed position relative to each other and to form a gap 44 there between. The outer ferrule arrangement 45 is fixed by solder 46 at each of its ends to the respective sections 42, 43 of the inner ferrule arrangement.

The PCF at its first fiber end section 41 has a mode stripper section 47 and the inner ferrule rear section 43 has a carving 47a exposing the PCF mode stripper length section 47.

The front end 43e of the inner ferrule rear section 43 is angled relative to the center axis of the ferrule structure to form an outwards facing facet for out-coupling light propagating in the inner ferrule arrangement and reduce back-reflection of light. A part 42b—for example a semi-annular part of the rear end of the inner ferrule front section—is angled relative to the center axis of the ferrule structure to out-couple light propagating in the inner ferrule arrangement and reduce back-reflections of light. The remaining part 42c is not angled but has a facet which is substantially perpendicular to the center axis. The not angled part 42c of the rear end of the inner ferrule front section is advantageously coated with a reflective coating for reducing back—reflection of light.

Two sensors 48a, 48b are mounted to the outer ferrule arrangement 45 above respectively the rear end of the inner ferrule front section and the carving 47a exposing the PCF mode stripper length section for monitoring the out-coupling efficiency of respectively the angled part 42b of the inner ferrule front section and the mode stripper 47.

Figure 6:
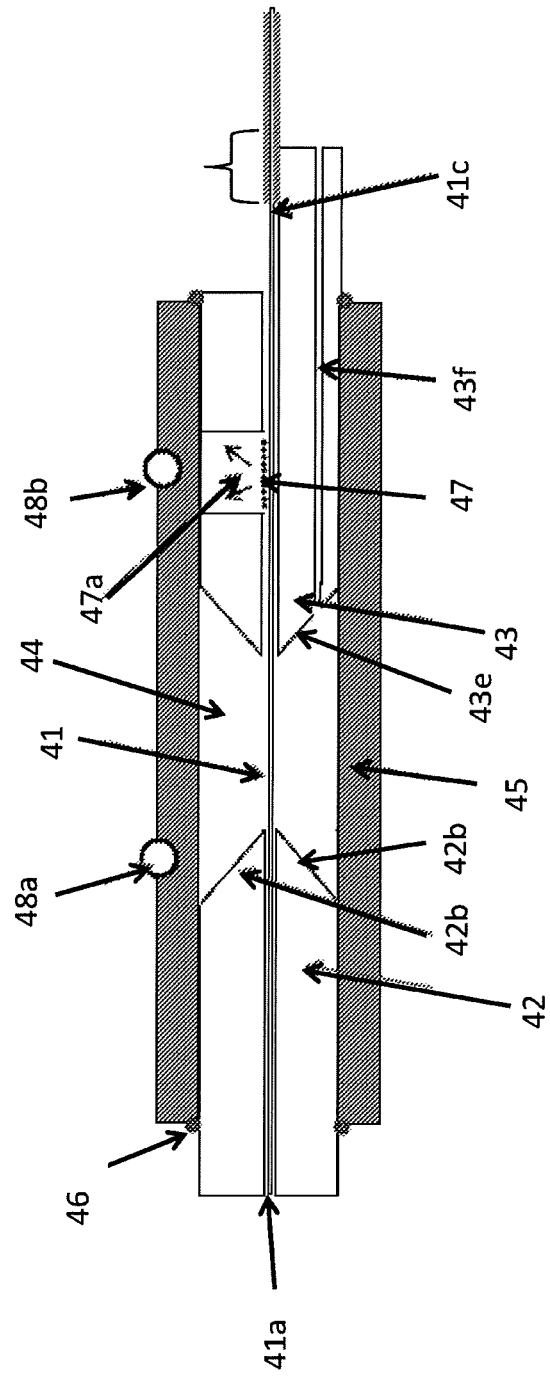
FIG. 6 is a cross view of a sixth embodiment of a PCF assembly according to the invention, where the rear end of the inner ferrule rear section in its entire annular extension is angled relative to the center axis of the ferrule structure to out-couple light propagating in the inner ferrule arrangement.

The PCF assembly of FIG. 6 is a variation of the PCF assembly of FIG. 5 with the modification that the entire rear end 42b of the rear end of the inner ferrule front section is angled relative to the center axis of the ferrule structure to out-couple light propagating in the inner ferrule arrangement and reduce back-reflections of light.

The PCF assembly of FIG. 7 comprises a photonic crystal fiber (PCF) assembly PCF with a first fiber end section 51 assembled with a ferrule structure comprising an inner ferrule arrangement comprising an inner ferrule front section 52 proximally to the first fiber end and an inner ferrule rear section 53 distally to first fiber end and surrounding the first fiber end section 51.

The inner ferrule rear section 53 is anchored to the first fiber end section 51, and from a point 51c of the PCF and to the first fiber end 51a, the PCF is free of polymer coating. The inner ferrule front section 52 supports the first fiber end section 51 proximally to the first fiber end 51a by mechanically holding said first fiber end section proximally to the first fiber end in axial position.

The ferrule structure further comprises an outer ferrule arrangement 55 fixed to each of the inner ferrule front section 52 and the inner ferrule rear section 53 to hold them in a fixed position relative to each other and to form a gap 54 there between. The outer ferrule arrangement 55 is fixed by solder 56 at each of its ends to the respective sections 52, 53 of the inner ferrule arrangement.

The PCF at its first fiber end section 51 has a mode stripper section 57 positioned between the inner ferrule front section 52 and the inner ferrule rear section 53.

The PCF assembly of FIG. 8 comprises a photonic crystal fiber (PCF) assembly PCF with a first fiber end section 61 assembled with a ferrule structure comprising an inner ferrule arrangement comprising an inner ferrule front section 62 proximally to the first fiber end and an inner ferrule rear section 63 distally to first fiber end and surrounding the first fiber end section 61.

The inner ferrule rear section 63 is anchored to the first fiber end section 61 in an anchor length section 63b, and from a point 61c of the PCF and to the first fiber end 61a, the PCF is free of polymer coating.

The ferrule structure comprises a hermetic solder element 66a arranged to surround the first fiber end section 61 to form an annular hermetic seal 66a between the first fiber end section 61 and the inner ferrule rear section 63, the hermetic solder element 66a is arranged closer to the inner ferrule front section 62 than the anchor length section 63b of the inner ferrule rear section. As seen in the drawing the anchoring length section 63b of the inner ferrule rear section 63 is not fully annular, the anchoring length section 63 of the inner ferrule rear section is preferably extending from about 20 degrees to about 350 degrees, such as about 180 degrees around the PCF.

The ferrule structure further comprises an outer ferrule arrangement 65 fixed to each of the inner ferrule front section 62 and the inner ferrule rear section 63 to hold them in a fixed position relative to each other and to form a gap 64 there between. The outer ferrule arrangement 65 is fixed by solder 66 at each of its ends to the respective sections 62, 63 of the inner ferrule arrangement.

The ferrule structure further comprises an end cap 67 arranged in front of the first fiber end 61c and preferably in direct contact with the first fiber end 61c. The end cap 67 is fixed directly to the inner ferrule front section. As explained above this embodiment is particularly beneficial where the PCF is a solid core PCF.

The PCF assembly of FIG. 9a comprises a photonic crystal fiber (PCF) assembly PCF with a first fiber end section 71 assembled with a ferrule structure comprising an inner ferrule arrangement comprising an inner ferrule front section 72 proximally to the first fiber end and an inner ferrule rear section 73 distally to first fiber end and surrounding the first fiber end section 71.

The inner ferrule rear section 73 is anchored to the first fiber end section 71 in an anchor length section 73b, and from a point 71c of the PCF and to the first fiber end 71a, the PCF is free of polymer coating.

The ferrule structure comprises a hermetic solder element 76a arranged to surround the first fiber end section 71 to form an annular hermetic seal 76a between the first fiber end section 71 and the inner ferrule rear section 73, the hermetic solder element 76a is arranged closer to the front annular section 72 than the anchor length section 73b of the inner ferrule rear section.

The hermetic solder element ensures a hermetic seal of the first fiber end section 71 from the first fiber end 71c and to the position in z-direction of the hermetic solder element 76a.

The ferrule structure further comprises an outer ferrule arrangement 75, 75a comprising an outer ferrule front section 75a and an outer ferrule rear section 75. The outer ferrule rear section 75 is fixed to each of the inner ferrule front section 72 and the inner ferrule rear section 73 to hold them in a fixed position relative to each other and to form a gap 74 there between. The outer ferrule rear section 75 is fixed by solder 76 at each of its ends to the respective sections 72, 73 of the inner ferrule arrangement and the outer ferrule front section 75a is fixed by solder 76 to the inner ferrule front section 72.

The ferrule structure further comprises an end cap 77 arranged in front of the first fiber end 71c. The end cap 77 is mounted with a distance to the inner ferrule front section 72, thereby forming an end cap space 78 between the end cap 77 and the inner ferrule front section 72. The end cap is fixed to the outer ferrule front section 75a of the outer ferrule arrangement. Thereby the outer ferrule front section 75a of the outer ferrule arrangement holds the end cap 77 in a desired position relative to the inner ferrule front section 72 and the first fiber end section 71c. As explained above this embodiment is particularly beneficial where the PCF is a hollow core PCF.

The inner ferrule arrangement 72, 73 comprises a passage into the end cap space 78 for injecting and/or withdrawing fluids. The passage is provided by additional through holes 72f, 73f in each of the inner ferrule front section 72 and the inner ferrule rear section 73. Advantageously a not shown valve arrangement is arranged to ensure a desired open/closing function into the through holes 72f, 73f and the end cap space 78.

Figure 9B:
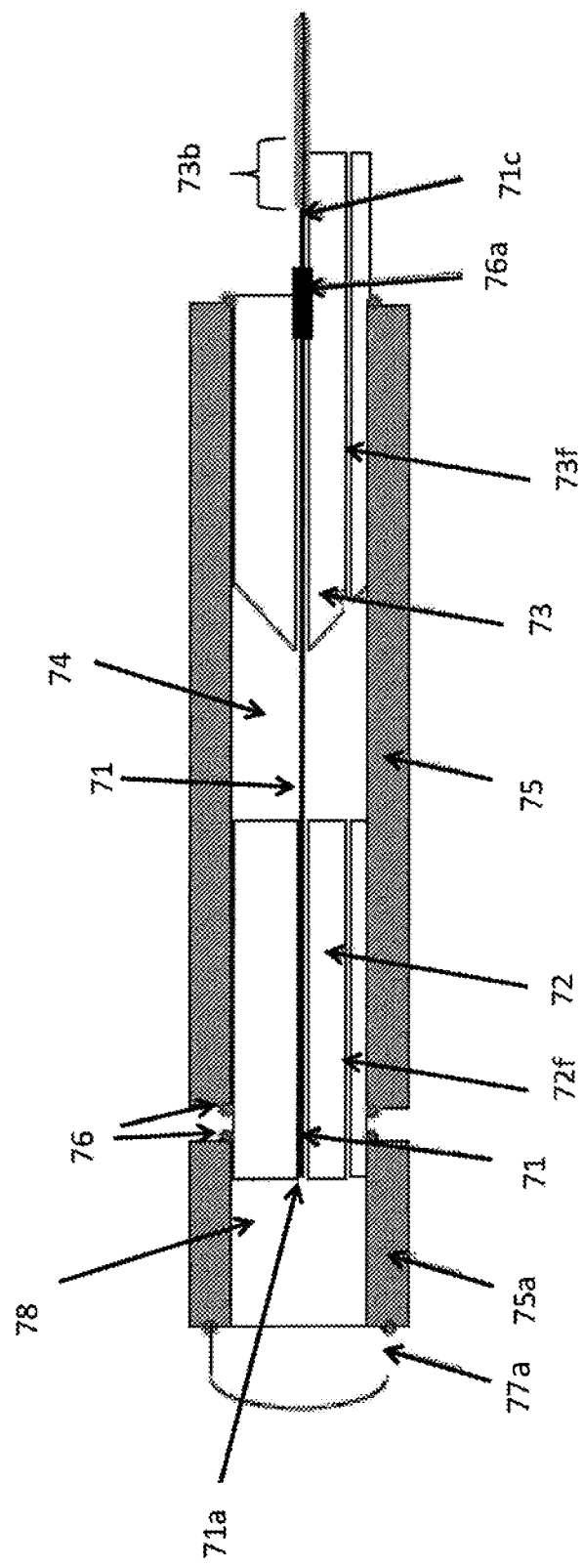

The PCF assembly shown in FIG. 9b, differs from the PCF assembly of FIG. 9a in that the end cap is a lens 77a, preferably the lens 77a comprises an antireflective coating on both of its sides.

Figure 10:
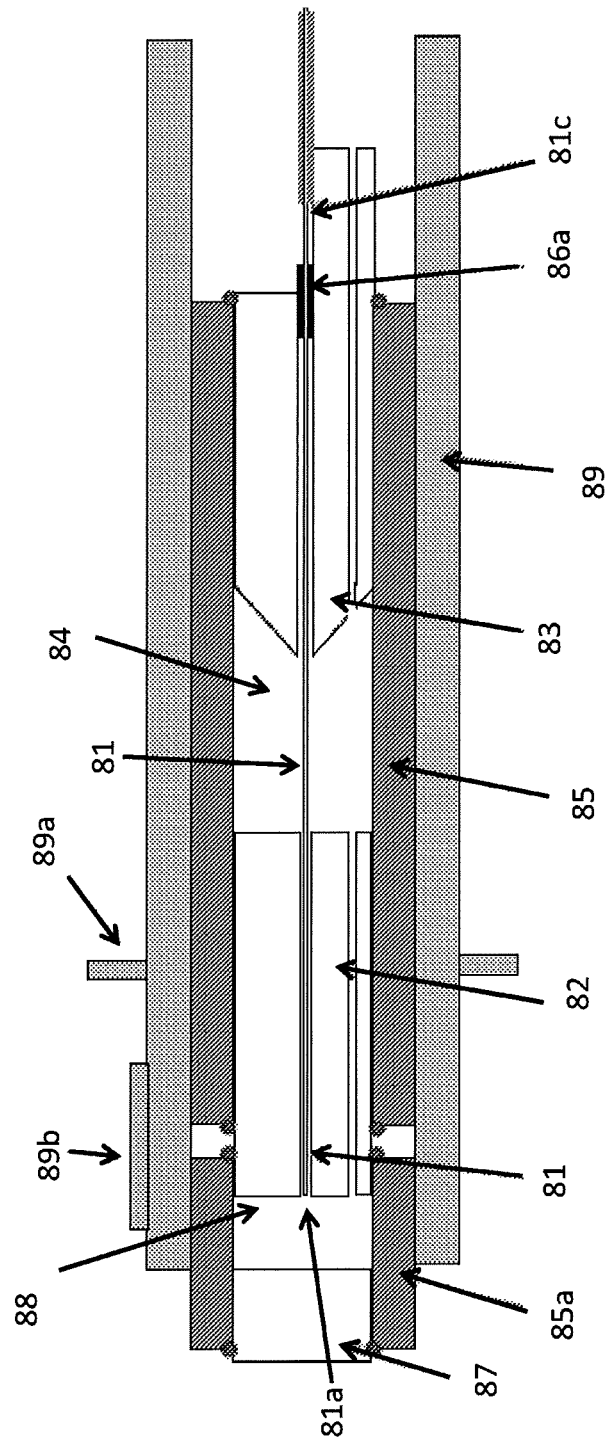
FIG. 10 is a cross sectional view of a tenth embodiment of a PCF assembly according to the invention, where the PCF assembly comprises an outer alignment jacket.

The PCF assembly of FIG. 10 comprises a photonic crystal fiber (PCF) assembly PCF with a first fiber end section 81 assembled with a ferrule structure comprising an inner ferrule arrangement comprising an inner ferrule front section 82 proximally to the first fiber end and an inner ferrule rear section 83 distally to first fiber end and surrounding the first fiber end section 81.

The inner ferrule rear section 83 is anchored to the first fiber end section 81 in an anchor length section 83b, and from a point 81c of the PCF and to the first fiber end 81a, the PCF is free of polymer coating.

The ferrule structure comprises a hermetic solder element 86a arranged to surround the first fiber end section 81 to form an annular hermetic seal 86a between the first fiber end section 81 and the inner ferrule rear section 83.

The hermetic solder element 86*a* ensures a hermetic seal of the first fiber end section 81 from the first fiber end 81*c* and to the position in z-direction of the hermetic solder element 86*a*.

The outer ferrule rear section 85 is fixed to each of the inner ferrule front section 82 and the inner ferrule rear section 83 to hold them in a fixed position relative to each other and to form a gap there between. The outer ferrule rear section 85 is fixed by solder 86 at each of its ends to the respective sections 82, 83 of the inner ferrule arrangement and the outer ferrule front section 85*a* is fixed by solder 86 to the inner ferrule front section 82.

The ferrule structure further comprises an end cap 87 arranged in front of the first fiber end 81*c*. The end cap 87 is mounted with a distance to the inner ferrule front section 82, thereby forming an end cap space 88 between the end cap 87 and the inner ferrule front section 82. The end cap is fixed to the outer ferrule front section 85*a* of the outer ferrule arrangement.

The ferrule structure comprises an outer alignment jacket 89 surrounding the outer ferrule arrangement 85, 85*a*, the outer alignment jacket preferably comprises means 89*a*, 89*b* for alignment, including in the shown embodiment a flange 89*a* for alignment and a protrusion 89*b* for rotational alignment e.g. for rotational fiber orientation.

The PCF assembly of FIG. 11 comprises a photonic crystal fiber (PCF) assembly PCF with a first fiber end section 91 assembled with a ferrule structure comprising an inner ferrule arrangement comprising an inner ferrule front section 92 proximally to the first fiber end and an inner ferrule rear section 93 distally to first fiber end and surrounding the first fiber end section 91.

The assembly further comprises an alignment sleeve 90 arranged between the inner ferrule front section 92 and the first fiber 91 end section to fully surround the first fiber end section 91, such that the inner ferrule front section 92 supports the first fiber end section 91 proximally to the first fiber end 91*a* via the alignment sleeve 90. In the shown embodiment of FIG. 11 the alignment sleeve 90 is a short section of a capillary tube.

The front end of the alignment sleeve 90, the front end of the inner ferrule front section 92 are and the first fiber end 91*a* are aligned in a plane perpendicular to the ferrule structure center axis.

The inner ferrule rear section 93 is anchored to the first fiber end section 91 in an anchor length section 93*b*, and from a point 91*c* of the PCF and to the first fiber end 91*a*, the PCF is free of polymer coating.

The ferrule structure comprises a hermetic solder element 96*a* arranged to surround the first fiber end section 91 to form an annular hermetic seal 96*a* between the first fiber end section 91 and the inner ferrule rear section 93.

The outer ferrule rear section 95 is fixed to each of the inner ferrule front section 92 and the inner ferrule rear section 93 to hold them in a fixed position relative to each other and to form a gap there between. The outer ferrule rear section 95 is fixed by solder 96 at each of its ends to the respective sections 92, 93 of the inner ferrule arrangement and the outer ferrule front section 95*a* is fixed by solder 96 to the inner ferrule front section 92.

The ferrule structure further comprises an end cap 97 arranged in front of the first fiber end 91*c*. The end cap 97 is mounted with a distance to the inner ferrule front section 92. The end cap is fixed to the outer ferrule front section 85*a* of the outer ferrule arrangement.

The ferrule structure comprises an outer alignment jacket 99 surrounding the outer ferrule arrangement 95, 95*a*, the outer alignment jacket preferably comprises means 99*a*, 99*b* for alignment.

A sensor 98 in mounted to the outer alignment jacket 99 for monitoring the connector performance and/or for monitoring fiber damage.

Figures 12A, 12B:
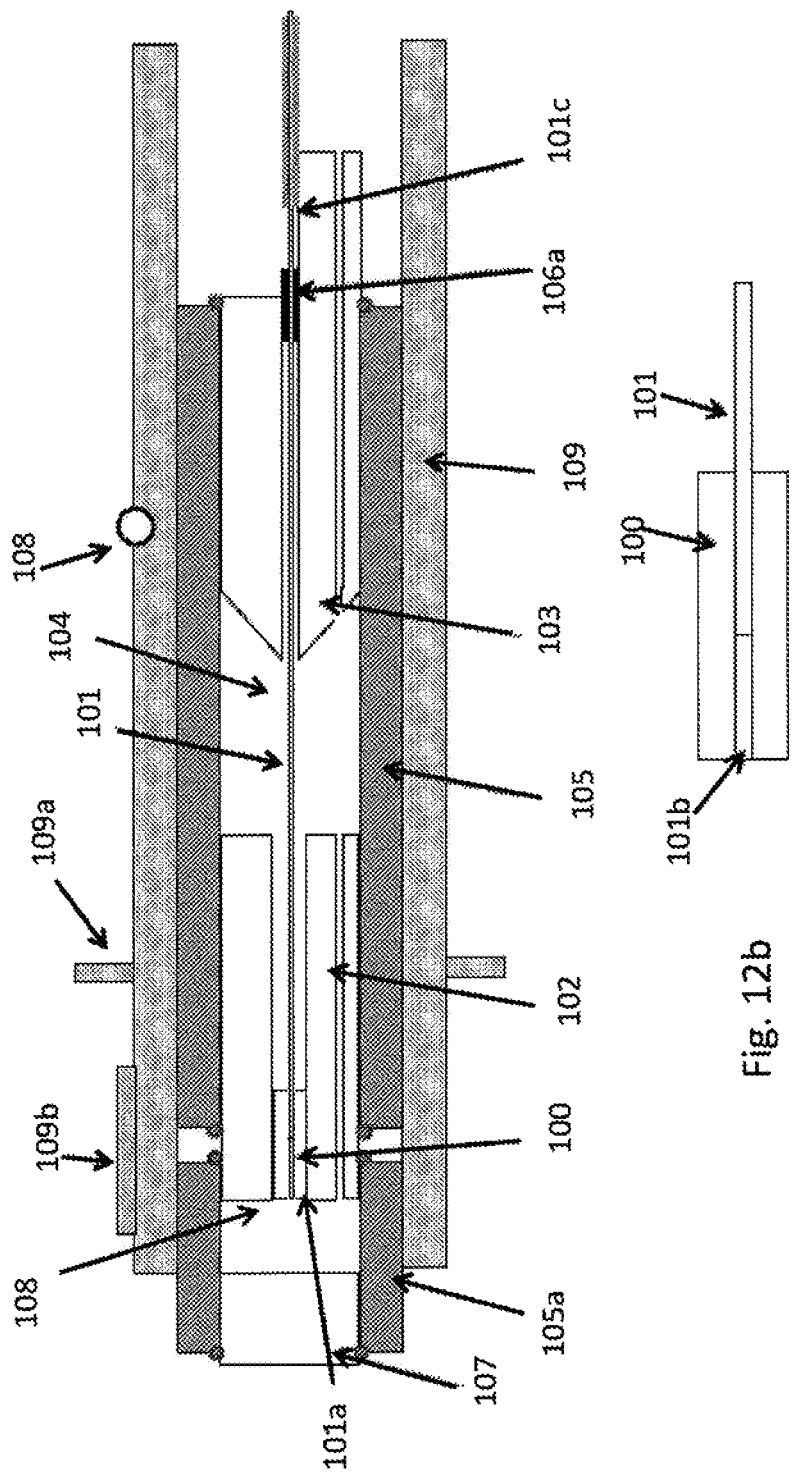

The PCF assembly of FIG. 12*a* and FIG. 12*b* comprises a photonic crystal fiber (PCF) assembly PCF with a first fiber end section 101 assembled with a ferrule structure comprising an inner ferrule arrangement comprising an inner ferrule front section 102 proximally to the first fiber end and an inner ferrule rear section 103 distally to first fiber end and surrounding the first fiber end section 101.

The assembly further comprises an alignment sleeve 100 arranged between the inner ferrule front section 102 and the first fiber 101 end section to fully surround the first fiber end section 101, such that the inner ferrule front section 102 supports the first fiber end section 101 proximally to the first fiber end 101*a* via the alignment sleeve 100. In the shown embodiment of FIG. 11 the alignment sleeve 100 is a short section of a capillary tube. The alignment sleeve 100 and the supported first fiber end section 101 are enlarged in FIG. 12*a* and it can be seen that the PCF comprises a short section of another fiber 101*b*, which is advantageously a section of hollow core capillary 101*b*.

The front end of the alignment sleeve 100, the front end of the inner ferrule front section 102 are and the first fiber end 101*a* are aligned in a plane perpendicular to the ferrule structure center axis.

The inner ferrule rear section 103 is anchored to the first fiber end section 101 in an anchor length section 103*b*, and from a point 101*c* of the PCF and to the first fiber end 101*a*, the PCF is free of polymer coating.

The ferrule structure comprises a hermetic solder element 86*a* arranged to surround the first fiber end section 101 to form an annular hermetic seal 106*a* between the first fiber end section 101 and the inner ferrule rear section 103.

The outer ferrule rear section 105 is fixed to each of the inner ferrule front section 102 and the inner ferrule rear section 103 to hold them in a fixed position relative to each other and to form a gap there between. The outer ferrule rear section 105 is fixed by solder 106 at each of its ends to the respective sections 102, 103 of the inner ferrule arrangement and the outer ferrule front section 105*a* is fixed by solder 106 to the inner ferrule front section 102.

The ferrule structure further comprises an end cap 107 arranged in front of the first fiber end 101*c*. The end cap 107 is mounted with a distance to the inner ferrule front section 102. The end cap is fixed to the outer ferrule front section 105*a* of the outer ferrule arrangement.

The ferrule structure comprises an outer alignment jacket 109 surrounding the outer ferrule arrangement 105, 105*a*, the outer alignment jacket preferably comprises means 109*a*, 109*b* for alignment.

A sensor 108 in mounted to the outer alignment jacket 109 for monitoring the connector performance and/or for monitoring fiber damage.

The PCF assembly of FIG. 13*a* and FIG. 13*b* comprises a photonic crystal fiber (PCF) assembly PCF with a first fiber end section 111 assembled with a ferrule structure comprising an inner ferrule arrangement comprising an inner ferrule front section 112 proximally to the first fiber end and an inner ferrule rear section 113 distally to first fiber end and surrounding the first fiber end section 111.

The assembly further comprises an alignment sleeve 110 arranged between the inner ferrule front section 112 and the first fiber 111 end section to fully surround the first fiber end section 111, such that the inner ferrule front section 112 supports the first fiber end section 111 proximally to the first fiber end 111*a* via the alignment sleeve 110. The alignment sleeve 100 supports the first fiber end section 111, by being collapsed in a supporting length section 110*b* onto the first fiber end section 111. In the not collapsed part 110*a* of the alignment sleeve 110 the alignment sleeve 110 has an outer diameter correlated to the inner diameter of the inner ferrule front section 112.

The inner ferrule rear section 113 is anchored to the first fiber end section 111 in an anchor length section 113*b*, and from a point 111*c* of the PCF and to the first fiber end 111*a*, the PCF is free of polymer coating.

The ferrule structure comprises a hermetic solder element 86*a* arranged to surround the first fiber end section 111 to form an annular hermetic seal 116*a* between the first fiber end section 111 and the inner ferrule rear section 113.

The outer ferrule rear section 115 is fixed to each of the inner ferrule front section 112 and the inner ferrule rear section 113 to hold them in a fixed position relative to each other and to form a gap there between. The outer ferrule rear section 115 is fixed by solder 116 at each of its ends to the respective sections 112, 113 of the inner ferrule arrangement and the outer ferrule front section 115*a* is fixed by solder 116 to the inner ferrule front section 112.

The ferrule structure further comprises an end cap 117 mounted with a distance to the inner ferrule front section 112. The end cap is fixed to the outer ferrule front section 115*a* of the outer ferrule arrangement.

The ferrule structure comprises an outer alignment jacket 119 surrounding the outer ferrule arrangement 115, 115*a*, the outer alignment jacket preferably comprises means 119*a*, 119*b* for alignment.

Figure 14A:
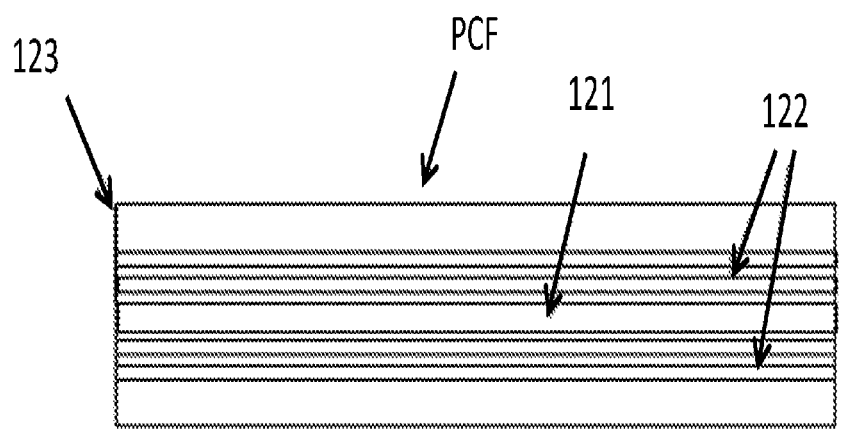
FIGS. 14a, 14b, 14c and 14d show schematic cross sectional views of PCF fiber end sections.

The PCF end section shown in FIG. 14*a* is a hollow core PCF and comprises a hollow core 121 and a surrounding cladding with a plurality of cladding holes 122. At the first fiber end 123 the PCF has a metallic or anti-reflex coating on fiber facet (fiber end), for protecting against incident light and/or back reflections.

Figure 14B:
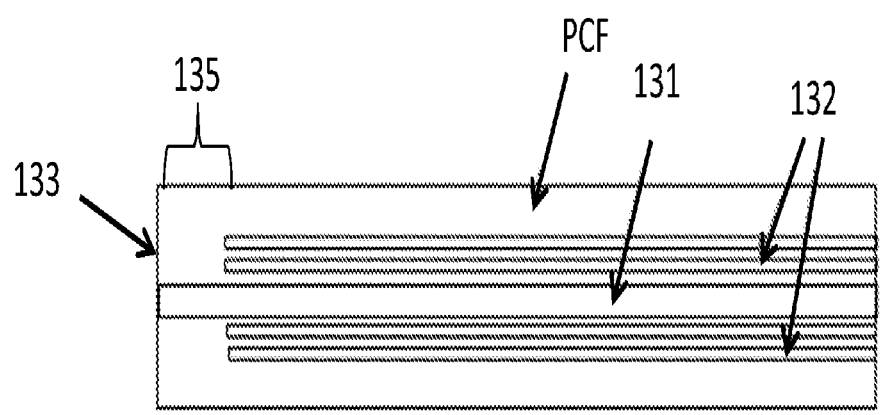

The PCF end section shown in FIG. 14*b* is a hollow core PCF and comprises a hollow core 131 and a surrounding cladding with a plurality of cladding holes 132. At a short end part 135 adjacent to the first fiber end 133—e.g. an end part with a length l of up to about 2 mm in length—the PCF cladding holes have been collapsed or sealed in other ways. The hollow core 131 is not sealed.

Figure 14C:
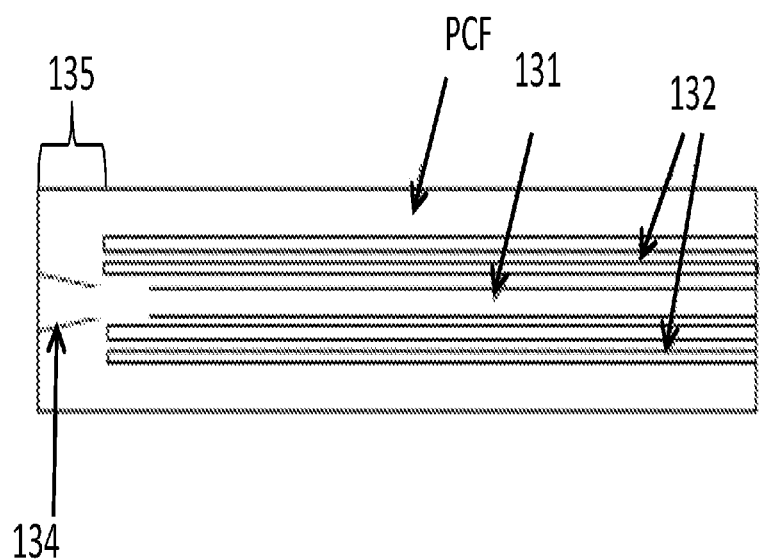
Figure 14D:
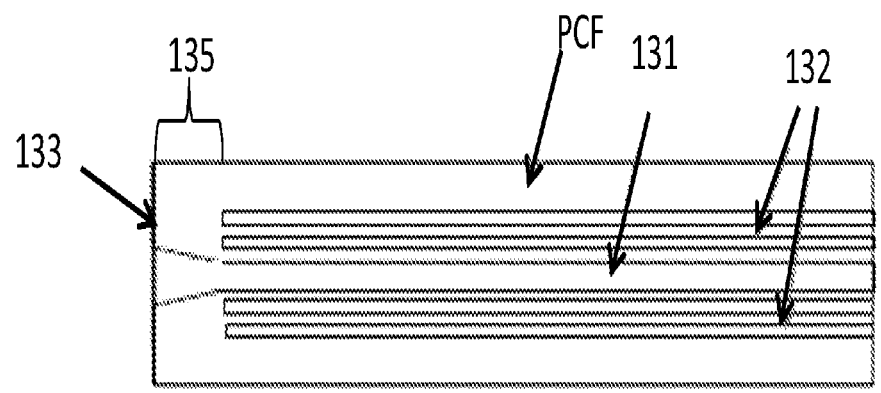

FIG. 14*c* shows another view of the hollow core PCF shown in FIG. 14*b*. Due to the sealed cladding holes 133 it can be seen that the light transmitted in the PCF is not fully confined in the end part with the length l and the light is spreading out in a cone shape 134. The alleviate this, a lens may e.g. be arranged in front of the first fiber end 133.

In FIG. 14*e* the hollow core PCF shown in FIG. 14*c* has further been provided with a metallic coating 133*a* for protecting against incident light and/or back reflections.

Figure 15:
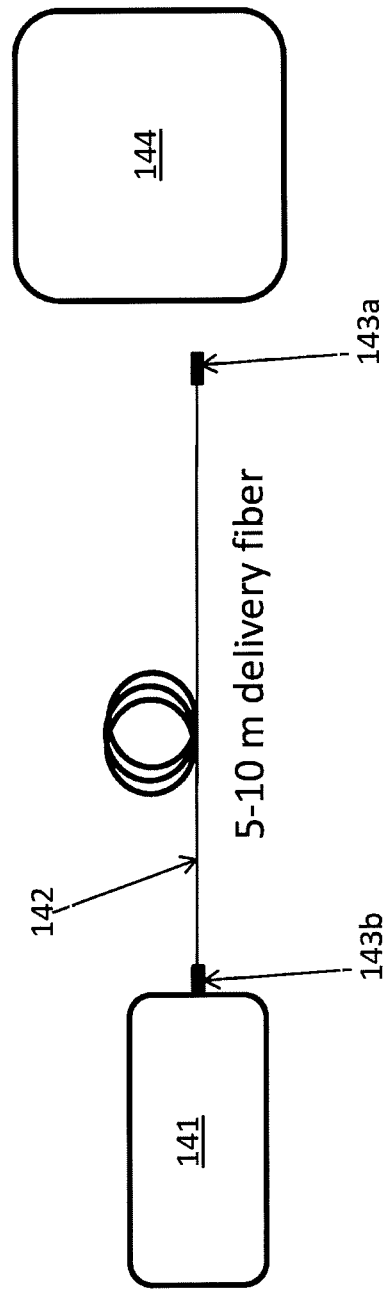
FIG. 15 is a schematic drawing of a laser system of an embodiment of the invention and a user apparatus.

The laser system shown in FIG. 15 comprises a laser light source 141 and a fiber delivery cable 142 for delivering light from the laser light source 141 to a user apparatus 144. The fiber delivery cable 142 comprises as its waveguide a hollow core PCF as described above with one or more low loss transmission bands correlated to the user apparatus. As indicated the fiber delivery cable 142 may be rather long while still being able to deliver single mode light with high efficiency and low loss in the fundamental mode to the user apparatus 144. The fiber delivery cable 142 has a first end 143*a* and a second end 143*b*. In the shown embodiment each of the first end 143*a* and a second end 143*b* are mounted in a ferrule structure as described above for connecting respectively to the user apparatus 144 and the laser light source 141.

Figure 16:
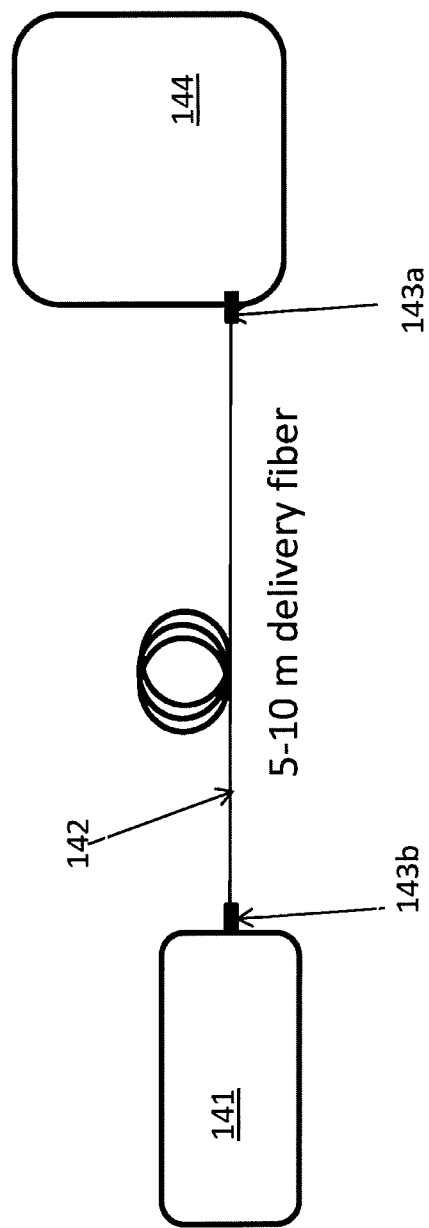
FIG. 16 is a schematic drawing of an apparatus of an embodiment of the invention and a user apparatus.

The apparatus of FIG. 16 comprises the laser system of FIG. 15 connected to the user apparatus 114.

Figure 17A:
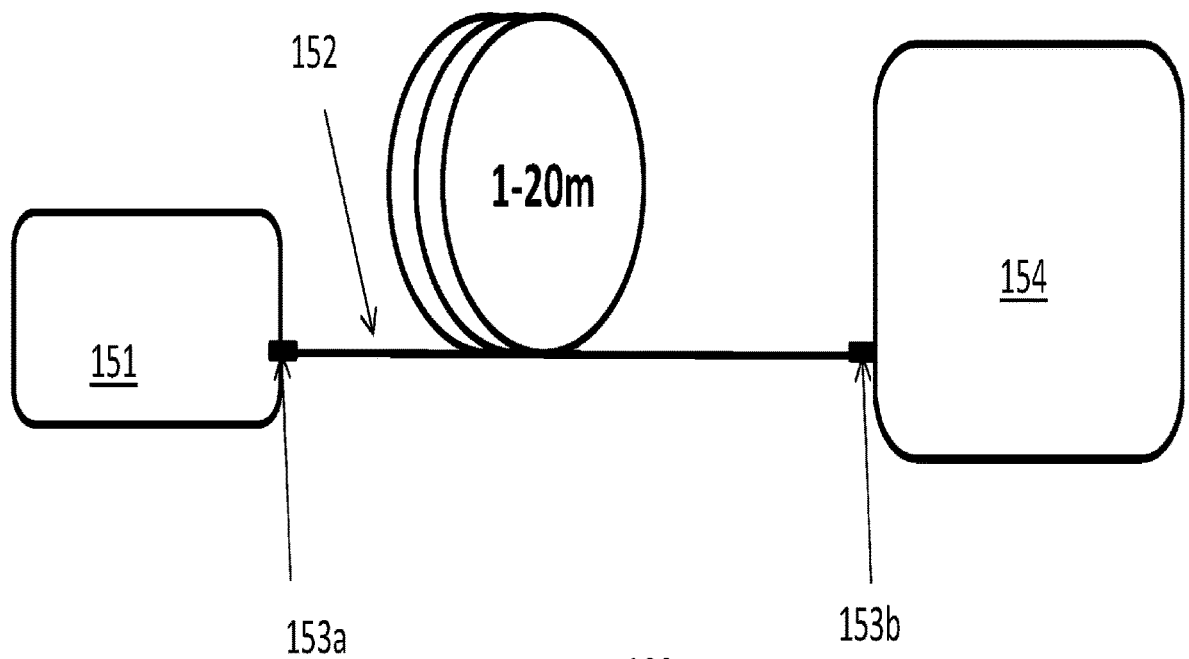
FIGS. 17a and 17b are schematic drawings of an apparatus of an embodiment of the invention and a user apparatus where the laser system is a supercontinuum laser system.
Figure 17B:
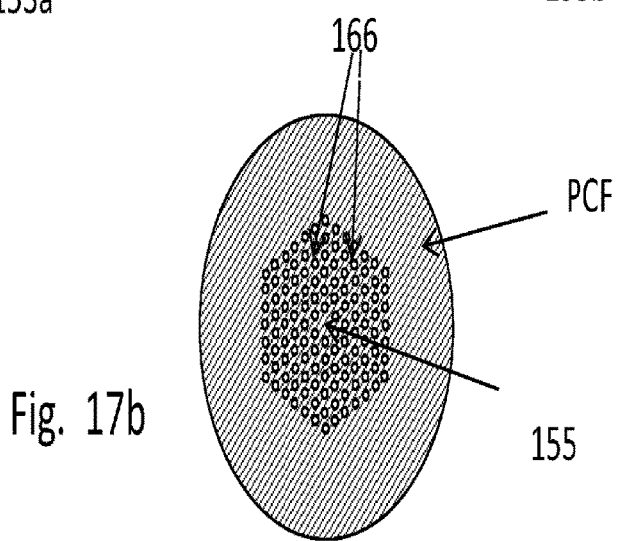

The apparatus of FIGS. 17*a* and 17*b* comprises a laser light source 151 delivering pulsed light and a cable 152 of a supercontinuum generating PCF arranged for generating and delivering supercontinuum light to a user apparatus 154. The fiber delivery cable 152 has a first end 153*a* and a second end 153*b*. In the shown embodiment each of the first end 153*a* and a second end 153*b* are mounted in a ferrule structure as described above for connecting respectively to the user apparatus 154 and the laser light source 151. The fiber delivery cable 152 comprises as its waveguide a solid core PCF as shown in FIG. 17*b* comprising a plurality of microstructures 166 surrounding the solid core 155.

EMBODIMENTS

1. A photonic crystal fiber (PCF) assembly comprising a PCF and at least one ferrule structure, said PCF has a center axis and comprises a core region and a cladding region and a first fiber end section with a first fiber end, said ferrule structure has a center axis and is mounted to said first fiber end section, said ferrule structure comprises an inner ferrule arrangement and an outer ferrule arrangement surrounding the first fiber end section, said inner ferrule arrangement comprises an inner ferrule front section proximally to said first fiber end and an inner ferrule rear section distally to said first fiber end, each of said inner ferrule sections have an inner diameter and in at least a length thereof fully surrounds the PCF, said inner ferrule rear section is anchored in an anchor length section to said first fiber end section and said inner ferrule front section supports said first fiber end section proximally to said first fiber end, said PCF center axis at the first fiber end section and said ferrule structure center axis are preferably substantially parallel, more preferably said PCF center axis at the first fiber end section and said ferrule structure center axis are coincident.

2. The PCF assembly of embodiment 1, wherein said assembly further comprises an alignment sleeve arranged between the inner ferrule front section and the first fiber end section, such that the inner ferrule front section supports said first fiber end section proximally to said first fiber end via said alignment sleeve, said alignment sleeve preferably being arranged to surround and support said first fiber end section at said first fiber end.

3. The PCF assembly of embodiment 2, wherein said inner ferrule front section surrounds and holds said alignment sleeve in a preselected axial position, said inner diameter of said inner ferrule front section is slightly larger than a maximal outer diameter of said alignment sleeve, such as from about 0.1 μm larger to about 2 mm larger, such as from about 1 μm larger to about 1 mm larger, such as from about 0.1 mm larger to about 0.01 mm larger in diameter.

4. The PCF assembly of any one of the preceding embodiments 2-3, wherein said inner ferrule front section supports said first fiber end section via said alignment sleeve and by mechanically holding said alignment sleeve in axial position, preferably an end of the alignment sleeve and an end of said inner ferrule front section are aligned in a plane perpendicular to the ferrule structure center axis, more preferably said first fiber end, said end of the alignment sleeve and said end of the inner ferrule front section are aligned in a plane perpendicular to the PCF center axis.

5. The PCF assembly of the preceding embodiments 2-4, wherein said alignment sleeve surrounds said PCF proximally to the first fiber end, preferably said first fiber end and an end of the alignment sleeve are aligned in a plane perpendicular to the PCF center axis, said alignment sleeve has a length in the axial direction which is preferably at least about 1 mm, such as from about 2 mm to about 5 cm, such as from about 5 mm to about 2 cm.

6. The PCF assembly of any one of the preceding embodiments 2-5, wherein said alignment sleeve supports said first fiber end section, by having an inner diameter at least along a support section thereof which is adapted to the outer diameter of the first fiber end section, preferably the inner diameter of the support section of the alignment sleeve is up to about 0.5 mm larger than the inner diameter, such as up to about 0.1 mm, such as up to about 0.01 mm.

7. The PCF assembly of any one of the preceding embodiments 2-6, wherein said alignment sleeve supports said first fiber end section by being collapsed onto the first fiber end section in its whole length or in said support section, said alignment sleeve is preferably a capillary tube which has been applied to surround the PCF and collapsed by heat in at least said support section thereof such as a mid-section thereof to thereby being arranged to support the PCF first fiber end section, said alignment sleeve preferably being fused to said optical fiber preferably without any intermediate material.

8. The PCF assembly of any one of the preceding embodiments 2-7, wherein said alignment sleeve is of glass, preferably silica glass, such as fused silica glass, fused quartz and/or doped silica, and/or borosilicate glass, such as a borosilicate glass comprising approximately 96% silica and 4% boron trioxide.

9. The PCF assembly of any one of the preceding embodiments 2-8, wherein said alignment sleeve has a refractive index of up to 1.45 for light at 1 μm, such as for light in the range 1-2 μm.

10. The PCF assembly of any one of the preceding embodiments 2-9, wherein said alignment sleeve is of down doped silica, such as silica doped with fluorine and/or boron.

11. The PCF assembly of any one of the preceding embodiments 2-10, wherein said alignment sleeve has a refractive index which is less than an effective refractive index of the cladding region.

12. The PCF assembly of any one of the preceding embodiments 2-11, wherein said alignment sleeve is hold within said inner ferrule front section without any intermediate material between the alignment sleeve and the inner ferrule front section, preferably said alignment sleeve is mechanically hold and/or fused to said inner ferrule front section.

13. The PCF assembly of any one of the preceding embodiments, wherein said inner ferrule front section and said inner ferrule rear section are not directly fixed to each other, preferably said inner ferrule front section and said inner ferrule rear section are arranged to have an intermediate gap in axial direction, preferably said gap provides a distance in axial direction between the inner ferrule front section and the inner ferrule rear section, said distance is preferably in the range from about 1 mm to about 10 cm, such as from about 5 mm to about 2 cm.

14. The PCF assembly of any one of the preceding embodiments, wherein said inner ferrule front section supports said first fiber end section proximally to the first fiber end directly, preferably by mechanically holding said first fiber end section proximally to the first fiber end in axial position, preferably an end of said inner ferrule front section and said first fiber end are aligned in a plane perpendicular to the PCF center axis.

15. The PCF assembly of any one of the preceding embodiments, wherein said ferrule structure comprises a hermetic solder element arranged to surround said first fiber end section to form an annular hermetic seal between the first fiber end section and said inner ferrule rear section, said hermetic solder element is arranged closer to the front annular section than the anchor length section of the inner ferrule rear section, preferably said anchoring length section of the inner ferrule rear section is not fully annular, said anchoring length section of the inner ferrule rear section is preferably extending from about 20 degrees to about 350 degrees, such as about 180 degrees around the PCF.

16. The PCF assembly of any one of the preceding embodiments, wherein said PCF is free of polymer coating in the first fiber end section from the anchoring section of the inner ferrule rear section to the first fiber end.

17. The PCF assembly of any one of the preceding embodiments, wherein said inner ferrule front section is of an at least partly transparent material at a wavelength between about 200 nm and about 4 μm, said inner ferrule front section is e.g. of fused or crystallized quartz, such as of substantially undoped silica having a refractive index of 1.45 for light at 1 μm.

18. The PCF assembly of any one of the preceding embodiments, wherein said inner ferrule rear section is of fused or crystallized quartz or of a metal or alloy.

19. The PCF assembly of any one of the preceding embodiments, wherein said outer ferrule arrangement is of metal, ceramic or glass such as silica.

20. The PCF assembly of any one of the preceding embodiments, wherein said outer ferrule arrangement is fixed to each of said inner ferrule front section and said inner ferrule rear section of said inner ferrule arrangement to hold them in a fixed position relative to each other, such that the first fiber end section of the PCF is preferably supported to be substantially straight within said ferrule structure, said outer ferrule arrangement is preferably fixed to said inner ferrule arrangement by glue, by solder and/or by being fused or laser welded.

21. The PCF assembly of any one of the preceding embodiments, wherein said first fiber end section is mounted in said ferrule structure substantially without application of stress generating pressure being applied to the fiber.

22. The PCF assembly of any one of the preceding embodiments, wherein said first fiber end section is mounted in said ferrule structure without any direct bonds to the fiber beyond one or more bonds to the inner ferrule rear section including the anchoring.

23. The PCF assembly of any one of the preceding embodiments, wherein said ferrule structure comprises an end cap arranged in front of said first fiber end, said end cap being mounted with a distance or without a distance to the inner ferrule front section, said end cap preferably being fixed directly to the inner ferrule front section or to an outer ferrule front section of the outer ferrule arrangement.

24. The PCF assembly of embodiment 23, wherein said end cap is fixed to said outer ferrule front section of the outer ferrule arrangement, said outer ferrule arrangement preferably comprises said outer ferrule front section and outer ferrule rear section, wherein said outer ferrule rear section is fixed to both the inner ferrule rear section and the inner ferrule front section and said outer ferrule front section is fixed to said inner ferrule front section.

25. The PCF assembly of embodiment 23 or embodiment 24, wherein said end cap is an anti-reflection coated silica end cap, said end cap preferably is or comprises a lens.

26. The PCF assembly of any one of the preceding embodiments, wherein said PCF is a hollow core fiber or a solid core fiber, preferably said first fiber end (facet) has a metallic or anti-reflex coating.

27. The PCF assembly of any one of the preceding embodiments, wherein said PCF has a core diameter of less than 100 μm, preferably of about 50 μm or less, such as from about 5 μm to about 40 μm.

28. The PCF assembly of any one of embodiments 23 and 25-27, wherein the PCF is a hollow core fiber and said end cap is fixed to said outer ferrule front section of the outer ferrule arrangement to provide an end cap space between said end cap and said inner ferrule front section, optionally said hollow core has a collapsed end part and a metallic or anti-reflex coating on the fiber facet.

29. The PCF assembly of embodiment 28, wherein the inner ferrule arrangement comprises a passage into said end cap space for injecting and/or withdrawing fluids, said passage is preferably provided by at least one additional through hole in each of said inner ferrule front section and said inner ferrule rear section, said additional through holes are preferably substantially parallel to the axis of the ferrule structure, more preferably the additional through hole comprises a valve arrangement at an exit from the inner ferrule rear section.

30. The PCF assembly of any one of the preceding embodiments, wherein said inner ferrule front section has a rear end, at least an in radial direction outer part of said rear end is angled relative to the center axis of the ferrule structure to out-couple light propagating in the inner ferrule arrangement, such as an in radial direction semi annular or annular outer part of said rear end is angled relative to the center axis of the ferrule structure to out-couple light propagating in the inner ferrule arrangement.

31. The PCF assembly of any one of the preceding embodiments, wherein said inner ferrule front section has a rear end, at least an in radial direction inner part of said rear end is angled relative to the center axis to form a funnel shape.

32. The PCF assembly of any one of the preceding embodiments, wherein said inner ferrule front section has a rear end, said rear end is coated with a reflective coating to back-reflect light, such as light propagating in the ferrule.

33. The PCF assembly of any one of the preceding embodiments, wherein said inner ferrule front section has a front end, said front end is coated with a reflective coating to protect the ferrule structure against incident and/or back-reflected light.

34. The PCF assembly of any one of the preceding embodiments, wherein said inner ferrule rear section has a front end, said front end is angled relative to the center axis of the ferrule structure and/or said front end is coated with a reflective coating to protect against incident and/or back-reflected light.

35. The PCF assembly of any one of the preceding embodiments, wherein said first fiber end section has at least one mode stripper length section, said mode stripper length section comprises a mode stripping high index material and or/a scatting layer applied in contact with the optical fiber at said mode stripper length section and/or said fiber in said mode stripper length section has a roughness Ra value of at least about 0.1 μm.

36. The PCF assembly of embodiment 35, wherein said mode stripper length section of said PCF is positioned between said inner ferrule front section and said inner ferrule rear section.

37. The PCF assembly of embodiment 35, wherein at least one of said inner ferrule front section and said inner ferrule rear section has a carving exposing said PCF said mode stripper length section of said PCF, said carving preferably partly surrounds the fiber preferably such that it extends at least about 20 degrees.

38. The PCF assembly of any one of the preceding embodiments, wherein the ferrule structure comprises a mode stripper coating arranged in direct contact with an outer surface of the inner ferrule front section, the mode stripper coating is preferably contained between the inner ferrule front section and the outer ferrule arrangement.

39. The PCF assembly of any one of the preceding embodiments, wherein the ferrule structure comprises an outer alignment jacket surrounding the outer ferrule arrangement, said outer alignment jacket preferably comprises means for alignment, preferably for alignment in the axial direction (z-direction), for alignment in the radial directions (x,y-directions) and/or for rotational alignment.

40. The PCF assembly of embodiment 39, wherein said means for alignment comprises one or more flanges, such as flanges for mounting with positioning control.

41. The PCF assembly of embodiment 39 or embodiment 40, wherein said means for alignment comprises a marker for rotational fiber orientation e.g. for PM orientation.

42. The PCF assembly of any one of the preceding embodiments, wherein the ferrule structure is configured for cooling by a cooling fluid said outer ferrule arrangement and/or said outer alignment jacket comprising passages with at least one inlet and at least one exit for said cooling fluid.

43. The PCF assembly of any one of the preceding embodiments, wherein said assembly further comprises one or more sensors, such as one or more optical sensors and/or electrical sensors and/or chemical sensors for monitoring temperature, for monitoring connector performance and/or for monitoring fiber damage.

44. The PCF assembly of any one of the preceding embodiments, wherein said assembly comprises a second ferrule structure connected to a second end section of the PCF, said second ferrule structure preferably is as the ferrule structure according to any one of the preceding embodiments.

45. A laser system comprising a PCF assembly according to any one of the preceding embodiments.

46. The laser system of embodiment 45, wherein said laser system comprises a laser light source, said PCF assembly being optically connected to said laser light source for receiving light from said laser light source and being adapted for delivering said light to a light employing station of an apparatus, preferably said first fiber end with said ferrule structure being adapted for being connected to said user apparatus.

47. The laser system of embodiment 45 or embodiment 46, wherein said laser light source is configured for generating laser light pulses, preferably said laser light source is a femtosecond laser source.

48. The laser system of embodiment 47, wherein said laser light source has a pump duration of from about 30 fs to about 30 ps, such as from about 100 fs to about 10 ps.

49. The laser system of embodiment 47 or embodiment 48, wherein said laser light source has a peak power determined at the exit of the laser light source which is at least about 5 kW, such as at least about 10 kW, such as at least about 30 kW, such as at least about 50 kW.

50. The laser system of any one of embodiments 47-49, wherein said laser light source is a mode locked laser, such as an actively mode locked laser or a passively mode locked laser, said mode locked laser preferably comprises one or more amplifiers.

51. The laser system of any one of embodiments 45-50, wherein said PCF is a hollow core PCF, preferably said hollow core PCF is configured for guiding light comprising at least one wavelength in the range from about 200 nm to about 4.5 µm, preferably at least one wavelength in the range from 1000 nm to about 1100 nm.

52. The laser system of embodiment 51, wherein said PCF is configured for guiding a continuum of light wavelengths, preferably spanning over at least about 0.1 µm, such as at least about 0.3 µm, such as at least about 0.5 µm.

53. The laser system of embodiment 51 or embodiment 52, wherein said hollow core PCF comprises an outer cladding region and a number N of hollow tubes surrounded by said outer cladding region, wherein each of said hollow tubes is fused to said outer cladding to form a ring defining an inner cladding region and said hollow core region surrounded by said inner cladding region, preferably N is from 6 to 12, more preferably N is 7.

54. The laser system of embodiment 453, wherein said hollow tubes are not touching each other, preferably said hollow tubes are arranged with a substantially equal distance to adjacent hollow tubes.

55. The laser system of any one of embodiments 45-50, wherein said PCF is a solid core PCF, preferably said solid core PCF is a microstructured solid core PCF comprising a plurality of non-solid and/or solid cladding inclusions, said solid core PCF is preferably configured for guiding light comprising at least one wavelength in the range from about 200 nm to about 4.5 µm, preferably at least one wavelength in the range from 1000 nm to about 1100 nm.

56. The laser system of any one of embodiments 45-55, wherein PCF has a core region diameter of from about 3 µm to about 100 µm, such as from about 10 µm to about 50 µm, such as from about 10 µm to about 30 µm.

57. A set of correlated ferrule elements suitable for a PCF assembly according to any one of embodiments 1-44, said set of ferrule elements comprises
an inner ferrule front section and an inner ferrule rear section for forming an inner ferrule arrangement; and
an outer ferrule arrangement,
wherein each of said inner ferrule front section, inner ferrule rear section and outer ferrule arrangement has a length and a center axis and comprises a main hollow through hole parallel with or coincident to said respective center axes, said set of correlated ferrule elements preferably further comprises an alignment sleeve having a length and a center axis and comprises a main hollow through hole parallel with or coincident to said center axis.

58. The set of correlated ferrule elements of embodiment 45, wherein the elements are correlated such that the alignment sleeve can be positioned in the main hollow through hole of the inner ferrule front section and the inner ferrule front section and the inner ferrule rear section can be mounted in the main hollow through hole of the outer ferrule arrangement for forming said inner ferrule arrangement.

59. The set of correlated ferrule elements of embodiment 57 or embodiment 58, wherein said alignment sleeve is a capillary tube and wherein said main hollow through hole of the alignment sleeve is has an inner diameter which is about 2 mm or less, such as about 1 mm or less such as about 0.5 mm or less, said alignment sleeve is preferably collapsible in at least a part of its length.

60. The set of correlated ferrule elements of any one of embodiments 57-59, wherein said alignment sleeve has a length in axial direction which is preferably at least about 1 mm, such as from about 2 mm to about 5 cm.

61. The set of correlated ferrule elements of any one of embodiments 57-60, wherein said set further comprises an end cap which is configured for being arranged in front of said inner ferrule front section by being mounted to said inner ferrule front section or by being mounted to an outer ferrule front section of the outer ferrule arrangement, said end cap is preferably an anti-reflection coated silica end cap.

62. The set of correlated ferrule elements of any one of embodiments 57-61, wherein each of said inner ferrule front section and said inner ferrule rear section comprises one or more additional through holes for providing a fluid passage, said additional through holes are preferably substantially parallel to the axis of the respective inner ferrule sections, more preferably the additional through hole at an exit from the inner ferrule rear section comprises a valve arrangement.

63. The set of correlated ferrule elements of any one of embodiments 57-62, wherein said inner ferrule front section has a rear end, at least an in radial direction outer part of said rear end is angled relative to the center axis of the inner ferrule front section and/or said rear end is coated with a reflective coating.

64. The set of correlated ferrule elements of any one of embodiments 57-63, wherein said inner ferrule front section has a front end, said front end is coated with a reflective coating.

65. The set of correlated ferrule elements of any one of embodiments 57-64, wherein said inner ferrule rear section has a front end, said front end is angled relative to the center axis of the inner ferrule rear section and/or said front end is coated with a reflective coating.

66. The set of correlated ferrule elements of any one of embodiments 57-65, wherein at least one of said inner ferrule front section and said inner ferrule rear section has a carving into its main hollow through hole, said carving preferably has an extension in an annular direction which extends at least about 20 degrees.

67. The set of correlated ferrule elements of any one of embodiments 57-66, wherein the set further comprises an outer alignment jacket correlated to the outer ferrule arrangement such that it can be arranged to surround the outer ferrule arrangement, said outer alignment jacket preferably comprises means for alignment.

68. An apparatus comprising a laser system according to any one of embodiment 45-56, wherein said PCF assembly is configured for delivering light to a light receiving station of said apparatus.

69. The apparatus of embodiment 68, wherein the apparatus is an illumination apparatus configured for illuminating a target, said illumination apparatus is preferably selected from a microscope, a spectroscope or an endoscope.

70. The apparatus of embodiment 69 wherein the illumination source is adapted for fluorescence Imaging; Fluorescence Lifetime Imaging (FLIM); Total Internal Reflection Fluorescence (TIRF) Microscopy; fluorescence resonance energy transfer (FRET); pulse interleave excitation foster resonance energy transfer (PIE-FRET); broadband Spectroscopy; nanophotonics; flow cytometry; industrial inspection, such as metrology; ringdown spectroscopy, such as gas sensing; analytical spectroscopy, such as hyperspectral spectroscopy, crop analysis e.g. of fruits and time of flight spectroscopy (TCSPC); single Molecule Imaging and/or combinations thereof.

71. The apparatus of embodiment 68, wherein the apparatus is a microprocessing apparat, preferably for material processing, such as drilling, marking, cutting and/or scribing.

72. The apparatus of embodiment 68, wherein the apparatus is a surgery apparat, such as an apparatus for eye surgery (ophthalmology).

The invention claimed is:

1. A photonic crystal fiber assembly, comprising:
a photonic crystal fiber (PCF),
wherein the PCF is a hollow core fiber, and
wherein the PCF has a center axis and comprises a core region and a cladding region and a first fiber end section with a first fiber end; and
a ferrule structure,
wherein the ferrule structure has a center axis, wherein the ferrule structure comprises:
a first ferrule part having a first length, and
a second ferrule part having a second length,
wherein the second ferrule part surrounds a part of the fiber such that a part of the fiber is mounted to the ferrule structure; and
an end cap fixed directly to the first ferrule part, such that the end cap is mounted with a distance to the first fiber end,
wherein the first ferrule part has a first diameter and wherein the second ferrule part has a second diameter that differs from the first diameter.

2. The photonic crystal fiber assembly according to claim 1, wherein the end cap is an anti-reflection coated silica end cap.

3. The photonic crystal fiber assembly according to claim 2, wherein both sides of the anti-reflection coated silica end cap are anti-reflection coated.

4. The photonic crystal fiber assembly according to claim 1, wherein the end cap is a lens.

5. The photonic crystal fiber assembly according to claim 1, wherein the first ferrule part and the second ferrule part are arranged to have an intermediate gap between them in an axial direction.

6. The photonic crystal fiber assembly according to claim 5, wherein the distance is around 1 mm.

7. The photonic crystal fiber assembly according to claim 5, wherein the intermediate gap between the first ferrule part and the second ferrule part extends around a part of the fiber.

8. The photonic crystal fiber assembly according to claim 1, wherein the first diameter is larger than the second diameter.

9. The photonic crystal fiber assembly according to claim 1, wherein the end cap is configured to provide a safe protection of the PCF, such that the PCF is protected against dust, and/or moisture, and/or heat.

10. The photonic crystal fiber assembly according to claim 1, wherein the PCF is configured to deliver light having a peak power above 5 kW.

11. A laser system for beam delivery, comprising:
a photonic crystal fiber assembly according to claim 1; and
a laser light source,
wherein the photonic crystal fiber assembly is optically connected to the laser light source for receiving light from the laser light source.

12. The laser system according to claim 11, wherein the light travels from the first ferrule part to the second ferrule part.

13. The laser system according to claim 11, wherein the laser light source is a pulsed laser light source.

14. The laser system according to claim 13, wherein the pulsed laser light source is a femtosecond laser light source.

15. The laser system according to claim 13, wherein the pulsed laser light source is a picosecond laser light source.

16. The laser system according to claim 13, wherein the pulsed laser light source is a nanosecond laser light source.

17. The laser system according to claim 11, wherein the laser light source is a CW laser light source.

18. The laser system according to claim 11, wherein the laser light source has a pump duration from 30 fs to 30 ps.

19. The laser system according to claim 11, wherein the laser light source has a pump duration from 100 fs to 10 ps.

20. The laser system according to claim 11, wherein the laser light source has a peak power determined at the exit of the laser light source which is at least about 5 kW.

21. The laser system according to claim 11, wherein the laser light source has a peak power determined at the exit of the laser light source which is at least about 10 kW.

22. The laser system according to claim 11, wherein the laser light source has a peak power determined at the exit of the laser light source which is at least about 30 kW.

23. The laser system according to claim 11, wherein the laser light source has a peak power determined at the exit of the laser light source which is at least about 50 kW.

24. The laser system according to claim 11, wherein the laser system is configured for supercontinuum generation and the laser light source is a mode-locked pump pulse light source arranged for feeding the PCF to generate supercontinuum.

25. The laser system according to claim 11, wherein the hollow core fiber is configured for guiding single mode light for at least one wavelength in the range from 200 nm to 4.5 µm.

26. The laser system according to claim 11, wherein the hollow core fiber is configured for guiding a continuum of light wavelengths spanning over at least 0.1 µm.

27. The laser system according to claim 11, wherein the ferrule structure is configured to be cooled by a cooling fluid surrounding the second ferrule part.

28. The laser system according to claim 27, wherein the outer ferrule arrangement is transparent to light that is stripped off, such that the stripped off light escapes via the second ferrule part and is absorbed by an outer alignment jacket surrounding the second ferrule part, whereby the outer alignment jacket is cooled by the cooling fluid.

29. The laser system according to claim 28, wherein the outer alignment jacket is configured to align the PCF with respect to an emitted beam or in-coupled beam of light from the laser light source.

30. The laser system according to claim 29, wherein the outer alignment jacket is configured to align the PCF in an axial direction.

31. The laser system according to claim 29, wherein the outer alignment jacket is configured to align the PCF in a rotational manner.

32. The laser system according to claim 29, wherein the outer alignment jacket is configured to align the PCF in one or more radial directions.

* * * * *